(12) United States Patent
Sasaki et al.

(10) Patent No.: US 6,377,452 B1
(45) Date of Patent: Apr. 23, 2002

(54) HEAT PIPE HINGE STRUCTURE FOR ELECTRONIC DEVICE

(75) Inventors: Chiyoshi Sasaki; Hiroaki Maekawa; Junji Sotani; Masaru Ohmi; Isao Tsukada; Toru Arimoto, all of Tokyo (JP)

(73) Assignee: Furukawa Electric Co., Ltd. (JP)

( * ) Notice: Subject to any disclaimer, the term of this patent is extended or adjusted under 35 U.S.C. 154(b) by 0 days.

(21) Appl. No.: 09/465,913

(22) Filed: Dec. 17, 1999

(30) Foreign Application Priority Data

| Dec. 18, 1998 | (JP) | 10-360784 |
| Apr. 9, 1999 | (JP) | 11-102761 |
| Apr. 9, 1999 | (JP) | 11-102883 |

(51) Int. Cl.[7] ............................................. H05K 7/20
(52) U.S. Cl. .................... 361/687; 165/86; 165/104.33; 165/185; 174/15.2; 361/700
(58) Field of Search ..................... 62/259.2; 16/223, 16/342; 174/15.2; 165/104.33, 104.26, 80.4; 361/687, 699, 700, 704, 707, 710, 715

(56) References Cited

U.S. PATENT DOCUMENTS

| 5,781,409 A | 7/1998 | Mecredy, III | 361/687 |
| 5,975,195 A | * 11/1999 | Lowry et al. | 165/104.33 |
| 6,097,596 A | * 1/2000 | Cipolla et al. | 361/687 |
| 6,078,499 A | * 6/2000 | Mok | 361/687 |
| 6,189,602 B1 | * 2/2001 | Tanahashi et al. | 165/104.33 |

FOREIGN PATENT DOCUMENTS

JP          10-187284        7/1998

* cited by examiner

Primary Examiner—Gregory Thompson
(74) Attorney, Agent, or Firm—Cantor Colburn LLP

(57) ABSTRACT

A heat pipe hinge structure for an electronic device comprises a heat pipe hinge member and a hinge portion. The heat pipe hinge member is made of a high heat-conductive material disposed at a coupling portion in which a pair of housing portions to be opened and closed are coupled. The heat pipe hinge member comprises a heat pipe hinge main body to receive a heat from a heat generating component disposed in one of the pair of housing portions, and a heat pipe holding portion provided in a vicinity of the heat pipe hinge main body to pivotably hold by an elastic member at least a part of a first heat pipe disposed in other of the pair of housing portions. The hinge portion is made of a low heat-conductive material to fix the heat pipe hinge member on at least one housing portion of the pair of housing portions.

8 Claims, 16 Drawing Sheets

HEAT PIPE HINGE STRUCTURE FOR ELECTRONIC DEVICE

BACKGROUND OF THE INVENTION

1. (Field of the Invention)

The present invention relates to a heat pipe hinge structure to dissipate a heat from a heat generating component such as CPU accommodated within a pair of housing portions, which is applied to an electric device such as a note book type personal computer, the housing portions of which is coupled through a hinge mechanism so as to be opened and closed.

2. (Description of Related Art)

There is disclosed in Japanese Patent Provisional Application No. 10-187284 (hereinafter referred to as "Prior Art 1") a heat pipe hinge structure for an electric device, which is applied to a note book type personal computer (hereinafter referred to a "personal computer"), for example, as this kinds of heat pipe hinge structure for the electronic device.

FIG. 18 shows a schematic view of the heat pipe hinge structure of the Prior Art 1. In Prior Art 1, the hinge structure to pivotably couple a CPU side housing portion 112 and a display side housing portion 114 in a personal computer comprises a hinge member comprising a portion 138b in a condensing side of a heat pipe 138 fixed on the CPU side housing portion, and a hinge member 152 fixed on the display side housing portion.

When the heat pipe 138 receives the heat from the heat generating component 124, the heat is transferred through the condenser section 138b and the hinge member 152. The heat thus transferred is further transferred to a heat transfer block 168 in the display side housing portion through the heat pipe 166 and the evaporator section 166b, and dissipated there toward the surrounding area.

More specifically, the evaporator section of the heat pipe is connected to the heat transfer block placed on the CPU in the CPU side housing portion, and the heat pipe extends into the display side housing portion through the circular bore 148 formed in the CPU side housing portion. The metal hinge member 152 is fixed on the display side housing portion, and the condenser section 138b of the heat pipe is inserted into the slotted portion formed in the hinge member 152. The so-called slotted forming is applied to the above-mentioned slotted portion in the hinge member 152, and the condenser section of the heat pipe is pivotably hold with appropriate sliding resistance through a frictional material layer disposed within the slotted portion in the hinge member 152.

The circular bore 148 and the slotted portion of the hinge member 152 are disposed in such manner that the opening and closing axis of the housing portions in the right hand side hinge mechanism is in accordance with that in the left hand side hinge mechanism. Accordingly, the opening and closing of the housing portions is guided by means of the pivot of the metal hinge member around the condenser section of the heat pipe in the hinge mechanism.

The heat pipe is formed so as to implement the heat transfer by the use of vaporization of the working fluid enclosed in the interior of the container. Accordingly, the heat generated by the CPU is transferred to the hinge member through the heat pipe when the personal computer is operated. The thus transferred heat is dissipated to the display side housing portion which temperature is relatively low. In this personal computer, another heat pipe is disposed so as to transfer the heat from the hinge member to the display side housing portion, thus improving heat dissipating effect.

The heat pipe hinge structure of the personal computer in the Prior Art 1 has the following problems.

Firstly, since the metal hinge member 152 closely contacts with the display side housing portion 114, when the temperature of the heat generated by the CPU is high, the heat transferred by the heat pipe is transferred to the conductive hinge member 152, and further to the display housing portion 114 through the contacting portion thereof, thus the temperature of the contacting portion in the display side housing portion becomes excessively high. In addition, when the heat pipe directly contacts With the circular bore 148 formed in the CPU side housing portion, the temperature of the portion in the vicinity of the circular bore in the CPU housing portion becomes excessively high. Accordingly, the scope of materials to be designed for the display side housing portion and the CPU side housing portion becomes narrower.

Furthermore, concerning the coupling structure of the heat pipe and the hinge member, since the condenser section of the heat pipe is hold within the slotted portion in the metal hinge member, as described above, the condenser section of the heat pipe has to be inserted into the slotted portion along the opening and closing axis of the housing portions when the personal computer is fabricated. On this case, the heat pipe is already installed in the CPU side housing portion, and the metal hinge member is already installed in the display side housing portion, respectively, thus the fabrication of the personal computer becomes very difficult.

Furthermore, concerning the strength of the heat pipe hinge structure, the opening and closing of the housing portions is guided by the heat pipe which has a hollow structure therein and the strength thereof is not sufficient, thus there is a problem in which the heat pipe may be possibly damaged.

Accordingly, the object of the present invention is to provide a heat pipe hinge structure for an electric device in which the temperature of the specific portion is prevented from becoming excessively high, the fabrication thereof is simple and easy, and such problems as the damage of the heat pipe is prevented from occurring.

SUMMARY OF THE INVENTION

The inventors have intensively studied to solve the above-mentioned problems in the prior art. As a result, it was found that when the heat pipe hinge member is arranged on the housing portion so as not to closely contact the housing portion, and in addition, when another heat pipe is installed on the heat generating component so as to distribute the heat therefrom, i.e., the heat is not excessively concentrated to the heat pipe hinge member, it is possible to prevent the specific portion of the housing portions from becoming excessively high.

Furthermore, it was found that when the heat pipe hinge member includes a heat pipe receptive groove in which the heat pipe is to be received, and a heat pipe fixing member to elastically fit the heat pipe hinge member from the upper side in which the heat pipe is received so as to pivotably hold the heat pipe in the heat pipe receptive groove, the heat pipe and the heat pipe hinge member can be coupled by simply placing the heat pipe into the heat pipe receptive groove and fitting the heat pipe fixing member on the heat pipe hinge member, when fabricated.

Furthermore, it was found that when the heat pipe hinge member and the hinge portion is coupled to form the hinge mechanism which guides the opening and closing of the housing portions, the opening and closing of the housing portions is implemented by the hinge mechanism without the heat pipe, thus no excessive force is applied to the heat pipe so as to prevent the damage of the heat pipe from occurring.

The invention was made on the basis of the above-mentioned findings.

The first embodiment of the heat pipe hinge structure for an electric device comprises:
(1) a heat pipe hinge member made of a heat-conductive material disposed at a coupling portion in which a pair of housing portions to be opened and closed are coupled, said heat pipe hinge member comprising a heat pipe hinge main body to receive a heat from a heat generating component disposed in one of said pair of housing portions, and a heat pipe holding portion provided in a vicinity of said heat pipe hinge main body to pivotably hold at least a part of a first heat pipe disposed in other of said pair of housing portions; and
(2) a hinge portion to fix said heat pipe hinge member on at least one housing portion of said pair of housing portions.

The second embodiment of the heat pipe hinge structure for an electronic device comprises:
(1) a heat pipe hinge member made of a high heat-conductive material disposed at a coupling portion in which a pair of housing portions to be opened and closed are coupled, said heat pipe hinge member comprising a heat pipe hinge main body to receive a heat from a heat generating component disposed in one of said pair of housing portions, and a heat pipe holding portion provided in a vicinity of said heat pipe hinge main body to pivotably hold at least a part of a first heat pipe disposed in other of said pair of housing portions; and
(2) a hinge portion made of a low heat-conductive material to fix said heat pipe hinge member on at least one housing portion of said pair of housing portions.

The third embodiment of the heat pipe hinge structure comprises the heat pipe hinge structure, wherein said heat pipe hinge main body includes a holding bore to securely hold one end portion of a second heat pipe, said heat pipe hinge main body receiving said heat from said heat generating component through said second heat pipe, and said heat pipe holding portion includes a heat pipe receptive groove for pivotably receiving said part of said first heat pipe and a heat pipe fixing member made of elastic material to press said part of said first heat pipe received in said heat pipe receptive groove.

The fourth embodiment of the heat pipe hinge structure comprises the heat pipe hinge structure, wherein said heat pipe hinge main body further includes a connecting portion to connect to a heat transfer plate member which transfers said heat of said heat generating component, and said heat pipe holding portion includes a heat pipe receptive groove for pivotably receiving said part of said first heat pipe and a heat pipe fixing member made of elastic material to press said part of said heat pipe received in said heat pipe receptive groove.

The fifth embodiment of the heat pipe hinge structure comprises the heat pipe hinge structure, wherein said heat pipe hinge main body further includes a connecting portion to connect to a heat sink which transfers said heat of said heat generating component, and said heat pipe holding portion includes a heat pipe receptive groove for pivotably receiving said part of said first heat pipe and a heat pipe fixing member made of elastic material to press said part of said heat pipe received in said heat pipe receptive groove.

The sixth embodiment of the heat pipe hinge structure comprises the heat pipe hinge structure, wherein said heat pipe hinge main body is integrally formed with a heat transfer plate member which transfers said heat of said heat generating component, and said heat pipe holding portion includes a heat pipe receptive groove for pivotably receiving said part of said first heat pipe and a heat pipe fixing member made of elastic material to press said part of said heat pipe received in said heat pipe receptive groove.

The seventh embodiment of the heat pipe hinge structure comprises the heat pipe hinge structure, wherein said heat pipe receptive groove in said heat pipe holding portion is provided in said heat pipe hinge main body.

The eighth embodiment of the heat pipe hinge structure comprises the heat pipe hinge structure, wherein said hinge portion is disposed in one housing portion of said pair of housing portions in which said heat generating component is not disposed, and said heat pipe hinge member is fixed by said hinge portion without contacting with one housing portion of said pair of housing portions in which said heat generating component is disposed.

The ninth embodiment of the heat pipe hinge structure comprises the heat pipe hinge structure, wherein said hinge portion is disposed in said pair of housing portions respectively, and said heat pipe hinge member is fixed by said hinge portion without contacting with one housing portion of said pair of housing portions in which said heat generating component is disposed.

The tenth embodiment of the heat pipe hinge structure comprises the heat pipe hinge structure, wherein said heat pipe hinge member is fixed by said hinge portion without contacting one housing portion of said pair of housing portions in which said heat generating component is disposed, and a third heat pipe to transfer the heat from said heat generating component to a prescribed another location is disposed in said heat transfer plate member integrally formed with said heat pipe hinge main body or said heat transfer plate member to be connected to said connecting portion of said heat pipe hinge main body.

The eleventh embodiment of the heat pipe hinge structure comprises the heat pipe hinge structure, wherein said heat sink includes a cooling fan in an interior thereof to transfer said heat of said heat generating component out of said housing portions.

The twelfth embodiment of the heat pipe hinge structure comprises the heat pipe hinge structure, wherein said heat sink includes another heat pipe.

The thirteenth embodiment of the heat pipe hinge structure comprises the heat pipe hinge structure, wherein said heat pipe hinge member is fixed by said hinge portion without contacting one housing portion of said pair of housing portions in which said heat generating component is disposed, and a third heat pipe to transfer the heat from said heat generating component to a prescribed another location is disposed on said heat generating component.

The first embodiment of the cooling device for an electronic equipment comprises:
(1) a heat pipe hinge member made of a high heat-conductive material disposed at a coupling portion in which a pair of housing portions to be opened and closed are coupled, said heat pipe hinge member comprising a heat pipe hinge main body to receive a heat from a heat generating component disposed in one of said pair of housing portions, and a heat pipe holding portion provided in a vicinity of said heat pipe hinge main body to pivotably hold at least a part of a first heat pipe disposed in other of said pair of housing portions;
(2) a hinge portion made of a low heat-conductive material to fix said heat pipe hinge member on at least one housing portion of said pair of housing portions; and (3) a heat sink to be connected with said heat generating component and said heat pipe hinge main body so as to transfer said heat of said heat generating component out of said pair of housing portions.

The second embodiment of the cooling device comprises the device, wherein said heat pipe holding portion includes a heat pipe receptive groove for pivotably receiving said part of said first heat pipe and a heat pipe fixing member made of elastic material to press said part of said heat pipe received in said heat pipe receptive groove, and said heat sink includes a cooling fan in an interior thereof.

The third embodiment of the cooling device comprises the device, wherein said heat sink includes another heat sink.

DETAILED DESCRIPTION OF THE PREFERRED EMBODIMENTS

One embodiment of the heat pipe hinge structure of the invention disposed in a note book type personal computer is described with reference to the drawings.

The heat pipe hinge structure for an electronic device of the invention comprises a heat pipe hinge member made of a high heat-conductive material disposed at a coupling portion in which a pair of housing portions to be opened and closed are coupled, and a hinge portion made of a low heat-conductive material to fix the heat pipe hinge member on at least one housing portion of the pair of housing portions.

Figure 1:
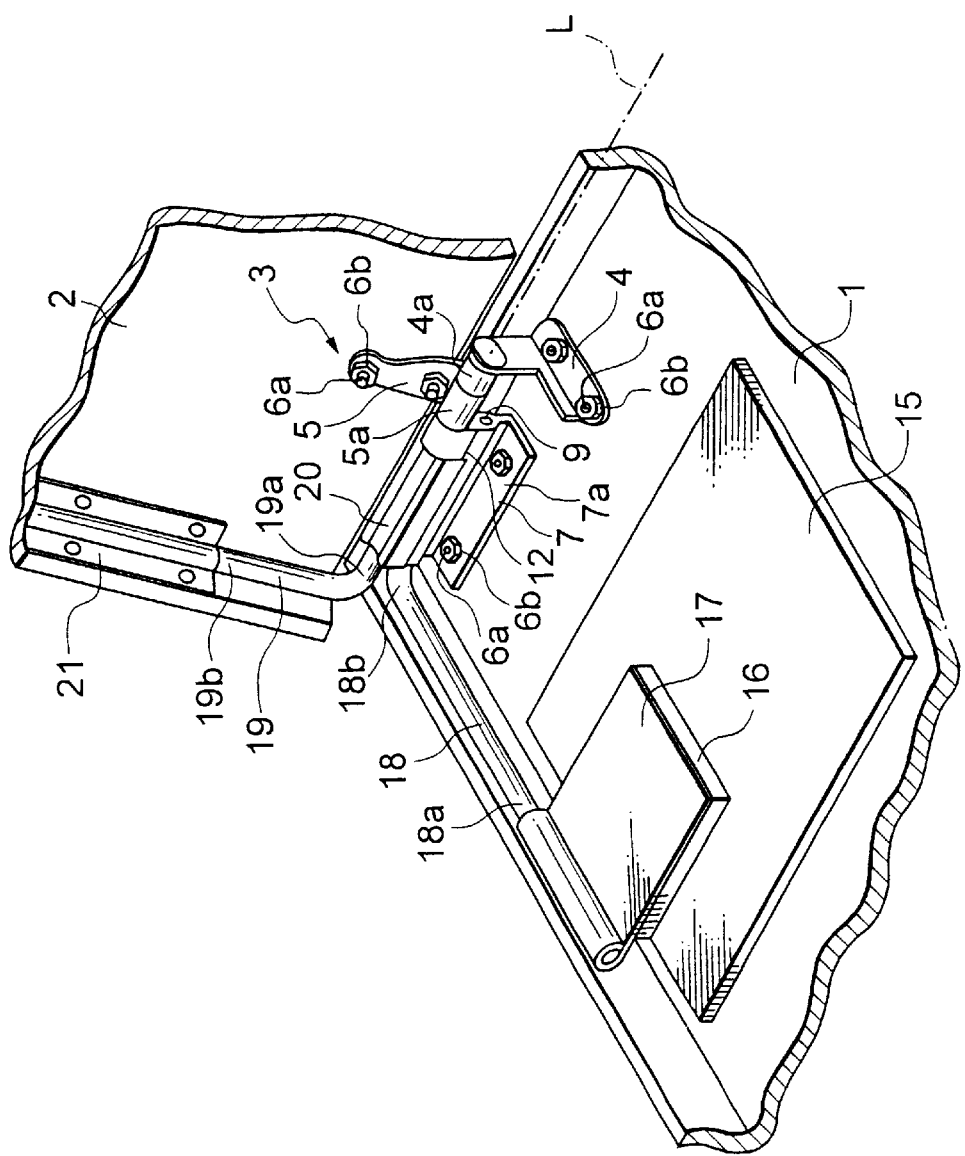
FIG. 1 is a schematic partial perspective view to show one embodiment of the assembled heat pipe hinge structure for an electronic device of the invention.
Figure 2:
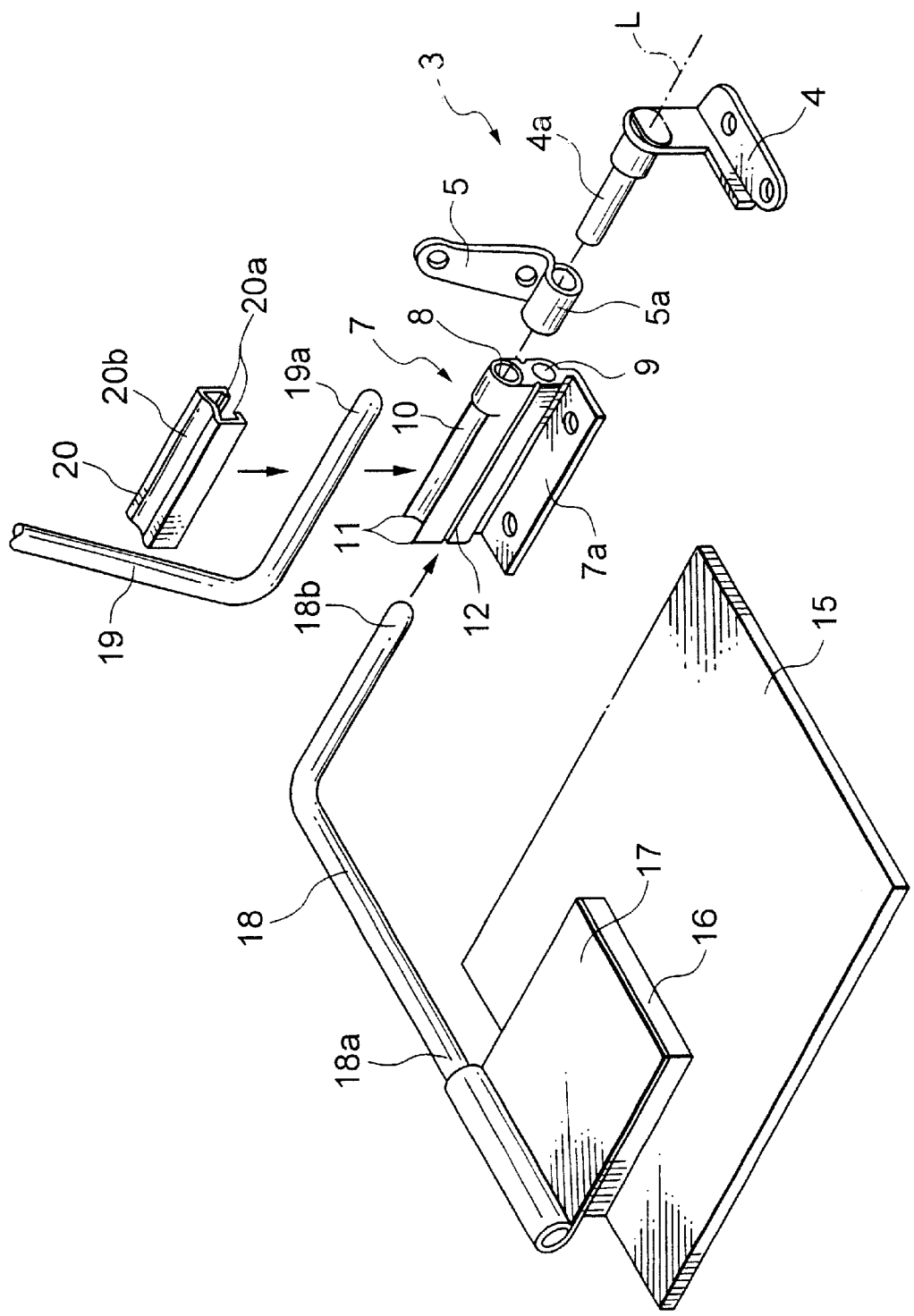
FIG. 2 is a schematic partial perspective view to show one embodiment of the disassembled heat pipe hinge structure.

FIG. 1 is a schematic partial perspective view to show one embodiment of the assembled heat pipe hinge structure for an electronic device of the invention. FIG. 2 is a schematic partial perspective view to show one embodiment of the disassembled heat pipe hinge structure.

As shown in FIGS. 1 and 2, in this embodiment of the personal computer, the CPU side housing portion 1 and the display side housing portion 2 are coupled through a pair of hinge portions 3 comprising the right side hinge portion and the left side hinge portion (in the drawings, only the left side hinge portion is shown). The key board (not shown) is disposed on the CPU side housing portion 1, and the liquid crystal display (not shown) is disposed on the display side housing portion 2. Both of the housing portions 1, 2 are opened and closed around the axis L of the opening and closing of the hinge portion 3 as its center. Thus, the closed position and the opened position are switched in such manner that the key board and the liquid crystal display are respectively enclosed so as to be stored in the closed position of the housing portions, and the key board and the liquid crystal display are exposed so as to be used in the opened position of the housing portions.

The CPU side housing portion 1 and the display side housing portion 2 are manufactured by bending the aluminum plate to form a thin box type housings with the respective upper sides opened for installing the key board and the liquid crystal display, respectively. Both of the hinge portion 3 comprise a fixed hinge portion 4 and a movable hinge portion 5 respectively, and are made laterally symmetric.

The hinge portion in the left hand side is described hereunder. The fixed hinge portion 4 is manufactured by bending the stainless plate to form a L shaped portion. One side portion of the fixed hinge portion is fixed on the bottom surface of the CPU side housing portion 1 by the vis (i.e., small sized screw) 6a and the nut 6b. The supporting shaft member 4a is fixed on the other side of the fixed hinge portion along the opening and closing axis L of the housing portions 1, 2. The movable hinge portion 5 is made of a stainless plate, and the base side of the movable hinge portion is fixed on the bottom surface of the display side housing portion 2 by the vis 6a and the nut 6b. The tip side of the movable hinge portion is bent to form a cylindrical bearing portion 5a. The supporting shaft member 4a of the fixed hinge portion 4 is inserted in the bearing portion 5a of the respective movable hinge portions 5, and the CPU side housing portion 1 and the display side housing portion 2 are opened and closed around the supporting shaft member 4a (i.e., the axis L of the opening and closing) as its center.

The housing portions 1, 2 may be manufactured by molding of plastics or magnesium alloy or the like. In this case, the nut 6b may be integrally formed with the housing portions 1, 2. The fixed hinge portion 4 and the movable hinge portion 5 are made of material having elasticity, for example, phosphor bronze.

The personal computer is used in such manner that the CPU side housing portion 1 is placed on the desk, and the display side housing portion 2 is opened and inclined to show the display surface. The display side housing portion 2 can be fixed at the selected angles to the CPU side housing portion, since the supporting shaft member 4a is hold with an appropriate sliding resistance within the bearing portion 5a by the elasticity of the bearing portion.

Figure 3:
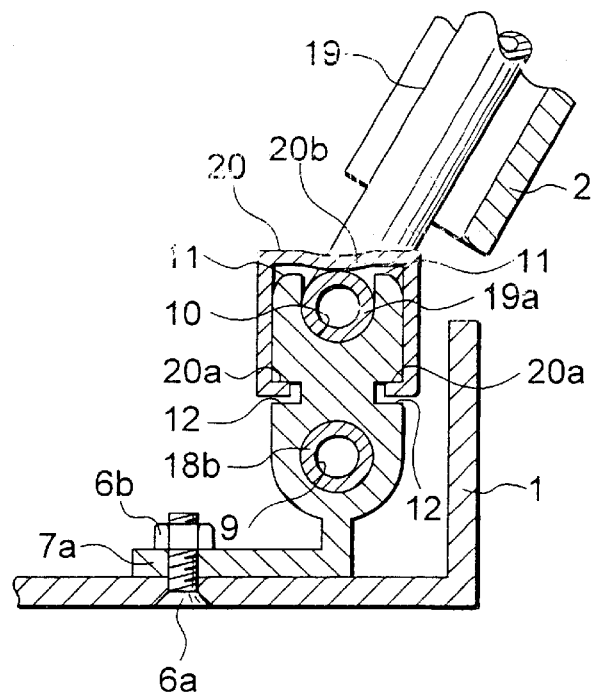
FIG. 3 is a schematic enlarged sectional view to show one embodiment of the heat pipe hinge structure of the invention in detail.

FIG. 3 is a schematic enlarged sectional view to show one embodiment of the heat pipe hinge member of the invention in detail. As shown in FIGS. 2 and 3, the heat pipe hinge member made of die-cast aluminum is arranged to position next to the left side of the left side hinge portion 3, and the fixing surface portion 7a, which is formed at the extended lower end of the heat pipe hinge member, is fixed on the bottom surface of the CPU side housing portion 1 by the vis 6a and the nut 6b. The heat pipe hinge member includes a heat pipe hinge main body to receive a heat from a heat generating component disposed in one of the pair of housing portions, and a heat pipe holding portion provided in a vicinity of the heat pipe hinge main body to pivotably hold at least a part of a first heat pipe disposed in the other housing portion of the pair of housing portions.

The heat pipe holding portion includes a heat pipe receptive groove for pivotably receiving the part of the first heat pipe and a heat pipe fixing member made of elastic material to press the part of the first heat pipe received in the heat pipe receptive groove. The above-mentioned heat pipe receptive groove in the heat pipe holding portion is provided in the heat pipe hinge main body.

More specifically, a locating bore 8 is provided in the heat pipe hinge member 7 in such manner that the axis of the locating bore is identical to the axis of the supporting shaft member 4a of the fixed hinge portion 4. Furthermore, a holding bore 9 is provided in the heat pipe hinge member below the locating bore in which the axis of the holding bore is in parallel to the axis of the locating bore. The end portion of the supporting shaft member of the fixed hinge portion 4 is pivotably fitted in the locating bore 8 from the right hand side. The upper portion of the locating bore 8 is removed so as to be opened upward except the portion in which the supporting shaft member is fitted, thus forming a heat pipe receptive groove 10. Extended guiding portions 11 are integrally formed on the both sides of the heat pipe receptive groove 10, as shown in FIG. 2. Furthermore, latching grooves 12 are formed below the respective extended guiding portions 11. The heat pipe hinge main body of the heat pipe hinge member 7 may be prepared by material having excellent heat-conductivity such as extrusion aluminum, copper, or the like.

A printed wiring board 15 is installed in the CPU side housing portion 1. Electronic components to execute arithmetic processing are mounted on the printed wiring board. A CPU as a heat generating component is mounted on the printed wiring board, and a square heat transfer plate 17 having the almost same size as the CPU is disposed in close contact on the CPU. One side of the heat transfer plate 17 is bent to form a cylindrical portion, and a evaporator section 18a of a second heat pipe 18 is inserted into the cylindrical portion and fixed therein by caulking. The second heat pipe 18 is placed along the side wall of the CPU side housing portion and squarely bent at the corner thereof without contacting the housing portion. The condenser section 18b of the second heat pipe in the other end is pressed into the holding bore 9 of the heat pipe hinge member 7, fixed therein, and applied caulking from both sides of the heat pipe hinge member 7 so as to prevent the heat pipe from being dropped therefrom.

The evaporator section 19a of the first heat pipe 19 is placed in the heat pipe receptive groove 10 of the heat pipe hinge member 7, and a heat pipe fixing member made of elastic material such as stainless steel, bronze or the like and bent formed is fitted from the upper side of the heat pipe receptive groove. Latching portions 20a are formed at the respective lower end portions of both sides of the heat pipe fixing member 20. The heat pipe fixing member 20 latches the latching portions 20a to the respective latching grooves 12 of the heat pipe hinge member 7, thus being fixed to the heat pipe hinge member 7 by means of the elasticity of its own material. The upper surface portion of the heat pipe fixing member 20 is bent downward to form a pressing portion 20b. The pressing portion 20b presses the evaporator section 19a of the first heat pipe from upper side by its elasticity, thus pivotably holding the first heat pipe in the heat pipe receptive groove 10.

The first heat pipe 19 is arranged along the side wall of the display side housing portion 2 and bent at the corner thereof, and the condenser section 19b of the first heat pipe is fixed on the housing portion 2 by a L-shaped fixing plate 21 made of aluminum plate.

Heat transfer grease is filled between the first heat pipe 19, the heat pipe receptive groove 10 and the heat pipe fixing member 20 to reduce the friction therebetween and the power applied from out side, thus reducing sliding resistance. The heat transfer grease excludes air inclusion to improve the heat conductivity from the heat pipe hinge member 7 to the first heat pipe 19.

The first heat pipe 19 and the second heat pipe 18 transfer heat by the use of the latent heat of vaporization of the working fluid enclosed therein. The principle of the operation is briefly described hereunder. The heat pipes 18, 19 are manufactured by the metallic material having excellent heat-conductivity such as aluminum or the like, and both ends thereof are hermetically sealed to form a sealed hollow space. Nickel plating is applied to the surface of the heat pipes 18, 19, and a wick structure such as fine grooves or the like is lined on the inner wall of the heat pipes. A working fluid such as water, acetone, substituted Freon or the like which is applicable to the material of the heat pipes 18, 19 is enclosed in a prescribed amount, and the pressure is reduced to a prescribed amount.

The heat generated by the CPU 16 is dissipated in the above-mentioned personal computer in the following manner.

When the personal computer is operated, the heat is generated by the CPU 16. The heat generated by the CPU is transferred to the evaporator section 18a of the second heat pipe 18 through the heat transfer plate 17 to evaporate the working fluid enclosed therein. The internal pressure of the evaporator section 18a rises by the evaporation of the working fluid. The vapor thus generated flows to the condenser section 18b in which the pressure is lower, and cooled so as to be condensed in the condenser section 18b. The thus condensed working fluid circulates to the evaporator section 18a through the wick structure by capillary action, and evaporated again by the heat from the CPU 16.

The above-mentioned heat transfer cycle is repeated so as to transfer the latent heat of vaporization from the CPU side to the heat pipe hinge member 7 through the second heat pipe 18, and the heat is further dissipated from the heat pipe hinge member 7 to the CPU side housing portion 1. Furthermore, the part of the heat transferred to the heat pipe hinge member 7 is transferred to the display side housing portion 2 by means of the heat transfer cycle repeated in the first heat pipe 19 in the same manner as described above in connection with the second heat pipe. Since the display side housing portion 2 does not accommodate electronic components therein, and the temperature thereof is relatively low, the heat dissipation in the display side housing portion is more effectively implemented than the heat dissipation in the CPU housing portion 1.

As described above, since the evaporator section 19a of the first heat pipe 19 is pressed by the pressing portion 20b of the heat pipe fixing member 20, the evaporator section is closely contacted with the inner wall of the heat pipe receptive groove 10 in the heat pipe hinge member 7 so as to secure a sufficient contact area.

Accordingly, the heat is surely transferred from the heat pipe hinge member 7 to the first heat pipe 19, thus effectively dissipating heat in the display side housing portion 2.

As is clear from the foregoing, in this embodiment of the invention, the hinge portion 3 in the left hand side as well as the hinge portion in the right hand side (not shown) independently function, whereas the heat pipes 18, 19 have nothing to do with the function of the hinge. More specifically, the heat pipe is used to guide the opening and closing of the housing portions in the Prior Art 1. However, since the heat pipes 18, 19 are not used to guide the opening and closing of the housing portions in the present invention, the unexpected power from the outside is not applied to the heat pipes 18, 19, thus preventing the heat pipes from being damaged. Although this kind of the note book type personal computer is sometimes unexpectedly treated in such manner that the display side housing portion is grabbed by hand and lifted up, the personal computer in which the heat pipe hinge structure of the invention is applied can be sufficiently sustained the above-mentioned rough handling.

The fabricating process of the heat pipe hinge structure of the present invention, in particular, the coupling process of the evaporator section 19a of the first heat pipe 19 and the heat pipe hinge member 7 is described hereunder.

Figure 4:
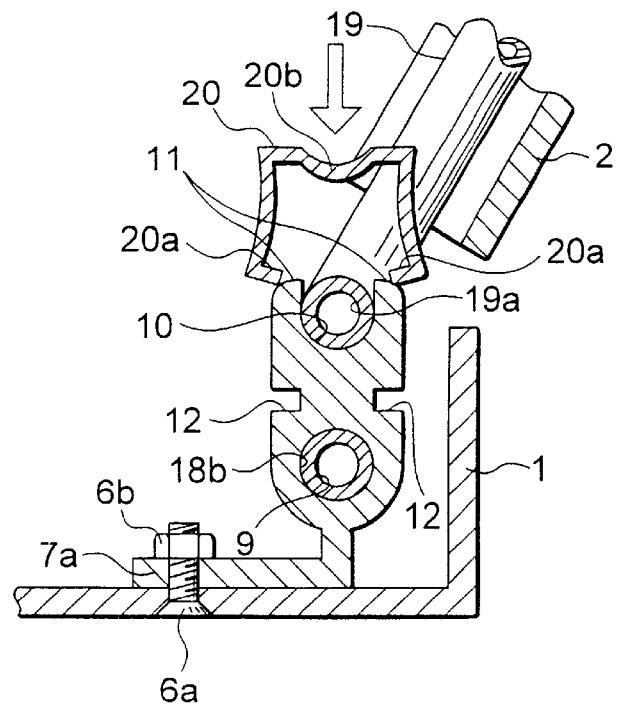
FIG. 4 is a schematic enlarged sectional view to show the process of fitting the heat pipe fixing member to the heat pipe hinge main body.

FIG. 4 is a schematic enlarged sectional view to show the process of fitting the heat pipe fixing member to the heat pipe hinge main body. When the first heat pipe 19 and the heat pipe hinge member 7 are coupled, the heat pipe hinge member 7 and the fixed hinge portion 4 are fixed on the CPU side housing portion, and the supporting shaft member 4a of the fixed hinge portion 4 is fitted into the bearing portion 5a of the movable hinge portion 5, respectively in advance. The condenser section 18b of the second heat pipe 18 connected to the CPU 16 is pressed and inserted into the holding bore 9 of the heat pipe hinge member 7. The condenser section of the first heat pipe 19 is fixed on the display side housing portion 2 by the fixing plate 21.

When the movable hinge portions 5 in both sides are fixed at the prescribed position on the display side housing portion 2 by the vis 6a and the nut 6b respectively in the state as mentioned above, the evaporator section 19a of the first heat pipe 19 is positioned without difficulty from the upper side into the heat pipe receptive groove 10 of the heat pipe hinge member 7. When the heat pipe fixing member 20 is fitted from the upper side into the heat pipe hinge member 7, following above, the latching portions 20a in both sides are guided by the extended guiding portions 11 of the heat pipe hinge member 7 to bend the heat pipe fixing member 20 as shown in FIG. 4, and then, the latching portions 20a latch the latching groove 12 of the heat pipe hinge member 7 as shown in FIG. 3. As a result, the heat pipe fixing member 20 is fitted to the heat pipe hinge member 7, thus the evaporator section 19a of the first heat pipe 19 is press-hold in the heat pipe receptive groove 10 by the pressing portion 20b.

Although other fabricating processes can be applied, the coupling of the first heat pipe and the heat pipe hinge member 7 is implemented in the same manner as mentioned above.

As described above, the coupling of the first heat pipe and the heat pipe hinge member 7 is implemented only by placing the evaporator section 19a of the first heat pipe 19 within the heat pipe receptive groove 10, and then fitting the heat pipe fixing member 20 into the heat pipe hinge member 7 from the upper side. Accordingly, compared with the Prior Art 1 in which the heat pipes are inserted along the axis of the opening and closing of the housing portions, the fabrication working is very easy in the present invention, thus simplifying the fabrication process of the personal computer.

Furthermore, when the housing portions are opened and closed, the evaporator section 19a of the first heat pipe 19 pivots within the heat pipe receptive groove 10 to absorb the changes of the angle formed between the axis of the heat pipe hinge member 7 and the axis of the heat pipe. Accordingly, it is necessary that the evaporator section 19a of the first heat pipe 19 is positioned on the same axis (i.e., the axis of the opening and closing of the housing portions) as the axis of the supporting shaft member 4a of the fixed hinge portion 4 which is the axis of the opening and closing of the housing portions. When the axis of the evaporator section 19a and the axis of the supporting shaft member 4a are not positioned on the same axis, the first heat pipe is bent so as to damage the heat pipe. In this embodiment, the axis of the evaporator section 19a and the axis of the supporting shaft member 4a are easily and surely positioned on the same axis simply by fitting the supporting shaft member 4a of the fixed hinge portion 4 into the locating bore 8 of the heat pipe hinge member 7. As a result, such troubles as the damage of the heat pipe can be avoided, and the fabricating processes are simplified.

Figure 5:
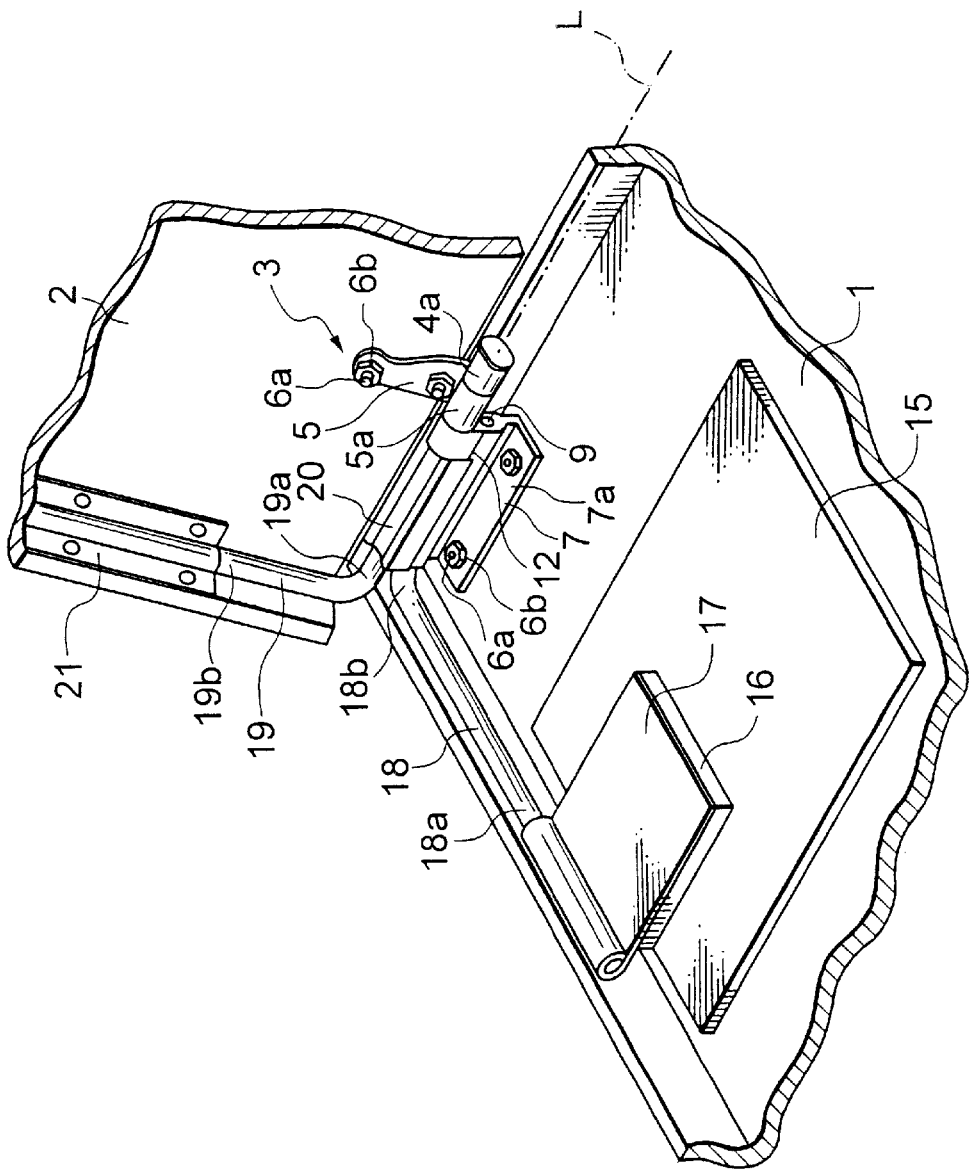
FIG. 5 is a schematic partial perspective view of another embodiment of the assembled heat pipe hinge structure with a fixed hinge portion removed.

The present invention is not limited to the above embodiment. For example, as described in FIG. 5, the fixed hinge portion 4 fixed on the CPU side housing portion 1 is removed and only the supporting shaft member 4a is remained. The supporting shaft member 4a is pressed into the locating bore 8 of the heat pipe hinge member 7 and fixed therein. In this case, the heat pipe hinge member 7 functions additionally as the fixed hinge portion 4, and the bearing portion 5a of the movable hinge portion 5 slidingly pivots around the supporting shaft member 4a to guide the opening and closing of the housing portions 1, 2. Thus, number of the component is reduced by removing the fixed hinge portion 4, and the hinge structure is down-sized to expand the effective space within the housing portions. Accordingly, in addition to the above-mentioned effect, manufacturing cost can be reduced and the scope of the choice of the layout of the printed wiring board is expanded.

As described above, the heat generated by the CPU disposed in the CPU side housing portion 1 is transferred to the display side housing portion 2 through the second heat pipe 18, the heat pipe hinge member 7, and the first heat pipe 19. However, the layout of the above components can be changed according to the various embodiments. For example, the heat pipe hinge member 7 is fixed on the display side housing portion 2, and the condenser section 18b of the second heat pipe connected to the CPU 16 is connected to the heat pipe hinge member 7, thus the first heat pipe 19 can be removed. Even in the above-mentioned layout, the housing portions can be effectively opened and closed as far as the axis of the heat pipe receptive groove 10 of the heat pipe hinge member 7 is accordingly positioned on the axis L of the opening and closing of the housing portions, and furthermore, the heat generated by the CPU can be dissipated to the display side housing portion 2 through the second heat pipe 18 and the heat pipe hinge member 7. Furthermore, when the heat generating component such as CPU or the like is positioned in the vicinity of the axis L of the opening and closing of the housing portions, the second heat pipe 18 can be removed (omitted), thus the CPU may be connected to the heat pipe hinge member 7 through the member such as copper or the like having excellent heat conductivity. In this case, the heat pipe hinge main body further includes a connecting portion to connect to a heat transfer plate which transfer the heat of the heat generating component.

In the above embodiment, the heat generated by the CPU can be sufficiently transferred to the heat pipe hinge member 7, and dissipated to the display side housing portion 2 through the first heat pipe 19.

Furthermore, in the above embodiment, the CPU housing portion 1 and the display housing portion 2 are made of aluminum plate having an excellent heat dissipation to dissipate the heat generated by the CPU 16. When the housing portions 1, 2 are made of plastics, the heat dissipation is not expected so much. Accordingly, the aluminum magnetic shielding plates disposed respectively in the housing portions 1, 2 can be used to dissipate the heat. More specifically, in the above embodiment, the condenser section 19b of the first heat pipe 19 may be connected to the magnetic shielding plate disposed in the display side housing portion 2, or the second heat pipe 18 is further extended and arranged in the opposite direction to the heat pipe hinge member 7 and connected to the magnetic shielding plate disposed under the key board. In the latter case, the working fluid is evaporated at the center portion of the second heat pipe, and condensed at the both end portions of the heat pipe to dissipate the heat.

The heat dissipation of the CPU is described above, however, the present invention is not limited to the CPU. The present invention is applied to the heat dissipation of the heat generating components such as a transformer, electric power portion or the like.

FIGS. 6 to 9 show other embodiments of the heat pipe hinge structure of the invention in which the temperature of the specific portion is prevented from becoming excessively high.

Figure 6:
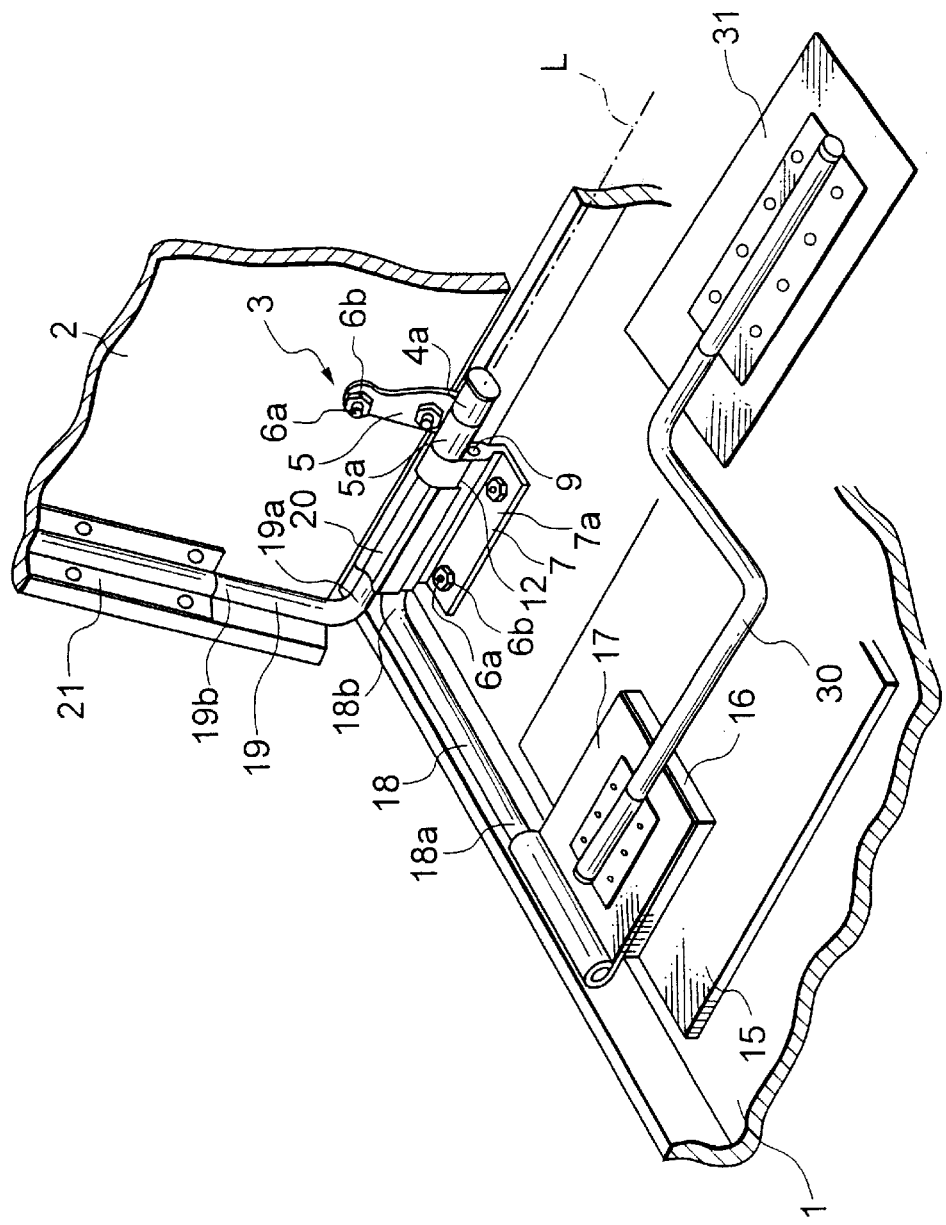
FIG. 6 is a schematic view to show one embodiment of the heat pipe hinge structure of the invention with further another heat pipe installed in the heat generating component.

FIG. 6 is a schematic view to show one embodiment of the heat pipe hinge structure of the invention with further another heat pipe installed in the heat generating component. As shown in FIG. 6, the third heat pipe 30 is provided on the heat transfer plate 17 along the direction perpendicular to the second heat pipe 18. The heat dissipating member 31 is disposed at the other end portion of the heat pipe 30. The heat transferred by the heat pipe 30 from the heat transfer plate 17 is dissipated to the housing portion through the heat transfer member 31. Since the heat transferred to the heat transfer plate 17 is dispersed by the second heat pipe 18 and the third heat pipe 30, the heat transferred by the second heat pipe 18 is further transferred by the first heat pipe in the heat pipe hinge member 7 to the display side housing portion, thus even if the fixing surface portion 7a provided at the lower portion of the heat pipe hinge member 7 is fixed in close contact on the CPU side housing portion, the temperature of the heat pipe hinge member 7 does not become excessively high.

In FIG. 6, the fixed hinge portion 4 fixed on the CPU side housing portion 1 is removed and only the supporting shaft member 4a is remained. The supporting shaft member 4a is pressed into the locating bore 8 of the heat pipe hinge member 7 and fixed therein. Accordingly, the bearing portion of the movable hinge portion 5 slidingly pivots around the supporting shaft member 4a to guide the opening and closing of the housing portions 1, 2.

Figure 7:
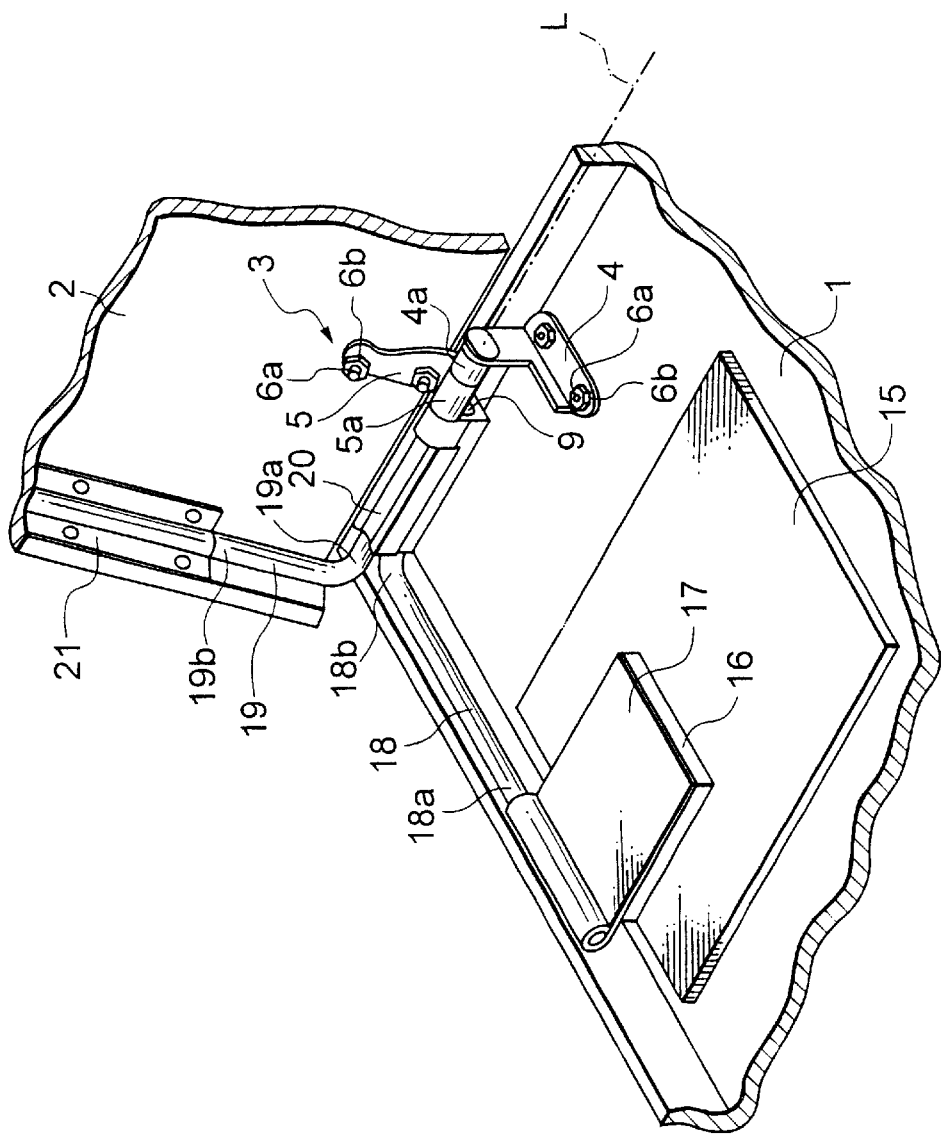
FIG. 7 is a schematic view to show one embodiment of the heat pipe hinge structure of the invention with the heat pipe hinge member not directly contacted with the housing portions.

FIG. 7 is a schematic view to show one embodiment of the heat pipe hinge structure of the invention with the heat pipe hinge member not directly contacted with the housing portions. As shown in FIG. 7, one end portion of the fixed hinge portion 4 made of stainless steel is fixed on the bottom surface of the CPU side housing portion 1 by means of the vis 6a and the nut 6b, and the supporting shaft member 4a is disposed and fixed along the axis of the opening and closing of the housing portions on the other end portion of the fixed hinge portion. Furthermore, the base side of the stainless steel movable hinge portion 5 is fixed on the bottom surface of the display side housing portion 2 by means of vis 6a and the nut 6b, and the tip side of the movable hinge portion 5 is bent to form a cylindrical bearing portion 5a. The supporting shaft member 4a of the fixed hinge portion 4 is inserted in the bearing portion 5a of the respective movable hinge portions 5, and the CPU side housing portion 1 and the display side housing portion 2 are opened and closed around the supporting shaft member 4a (i.e., the axis L of the opening and closing) as its axis.

As shown in FIG. 7, the heat pipe hinge member 7 is arranged in such manner that the heat pipe hinge member is not directly contacted with neither of the housing portions (i.e., fixing surface portion formed at the lower portion of the heat pipe hinge member and fixed on the CPU side housing portion is removed). Accordingly, since the heat pipe hinge member is supported by the fixed hinge portion made of stainless steel which has low heat conductivity, the heat transferred by the second heat pipe to the heat pipe hinge member, even if the temperature of the heat is high, is further transferred by the first heat pipe to the display side housing portion, thus the heat of high temperature is not directly transferred to the CPU side housing portion.

Figure 8:
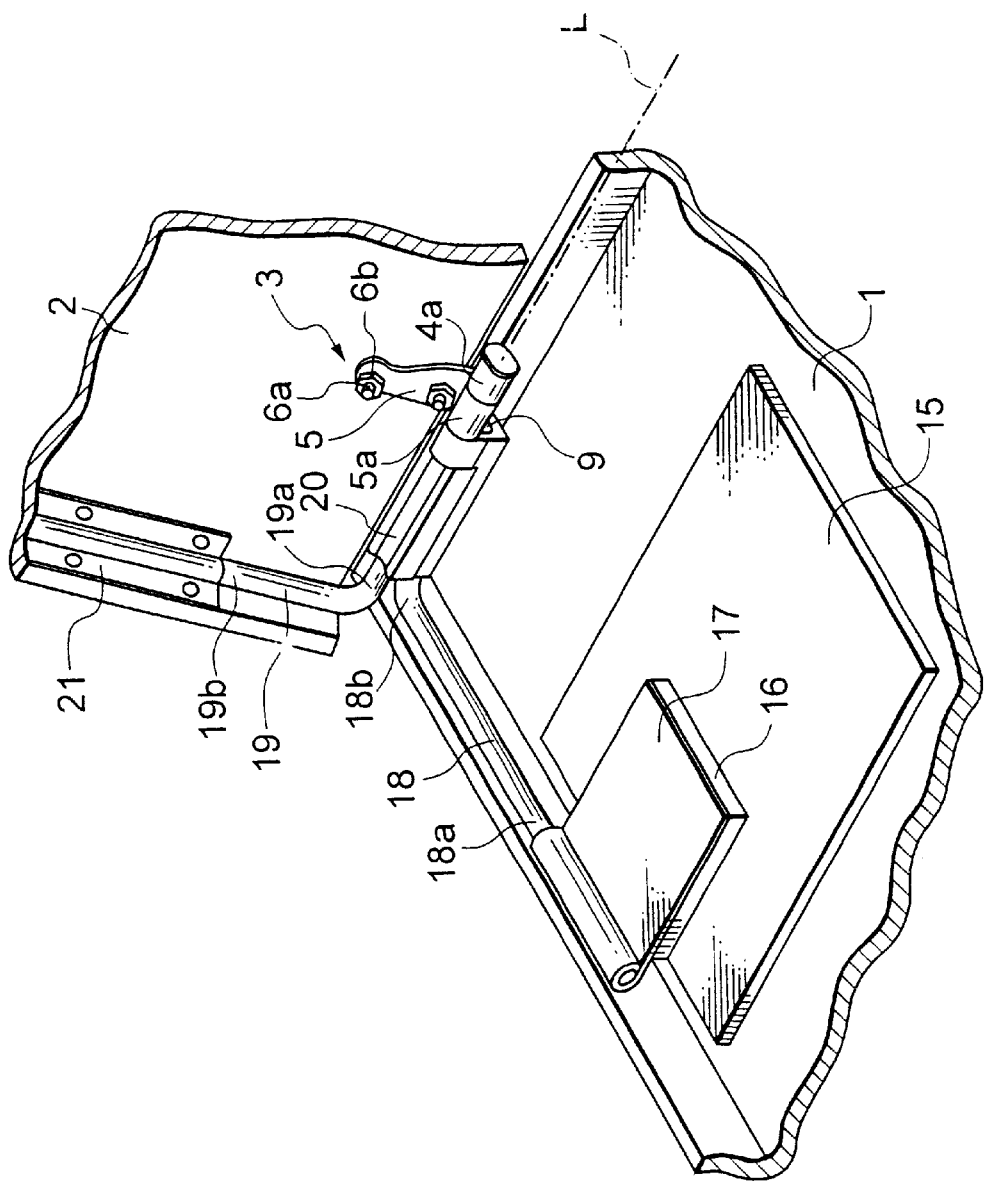
FIG. 8 is a schematic view to show another embodiment of the heat pipe hinge structure of the invention with the heat pipe hinge member not directly contacted with the housing portions.

FIG. 8 is a schematic view to show another embodiment of the heat pipe hinge structure of the invention with the heat pipe hinge member not directly contacted with the housing portions. As shown in FIG. 8, the base side of the stainless steel movable hinge portion 5 is fixed on the bottom surface of the display side housing portion 2 by means of vis 6a and the nut 6b, and the tip side of the movable hinge portion 5 is bent to form a cylindrical bearing portion 5a. The fixed hinge portion 4 fixed on the CPU side housing portion 1 is removed and only the supporting shaft member 4a is remained. The supporting shaft member 4a is pressed into the locating bore 8 of the heat pipe hinge member 7 and fixed therein. The supporting shaft member 4a of the fixed hinge portion 4 is inserted in the bearing portion 5a of the movable hinge portions 5.

Furthermore, as shown in FIG. 8, the heat pipe hinge member 7 is arranged in such manner that the heat pipe hinge member is not directly contacted with neither of the housing portions, as same as described in the embodiment as shown in FIG. 7. Accordingly, the bearing portion of the movable hinge portion 5 slidingly pivots around the supporting shaft member 4a to guide the opening and closing of the housing portions 1, 2. Therefore, since the heat pipe hinge member is supported by the fixed hinge portion made of stainless steel which has low heat conductivity, the heat transferred by the second heat pipe to the heat pipe hinge member, even if the temperature of the heat is high, is further transferred by the first heat pipe to the display side housing portion, thus the heat of high temperature is not directly transferred to the CPU side housing portion.

Figure 9:
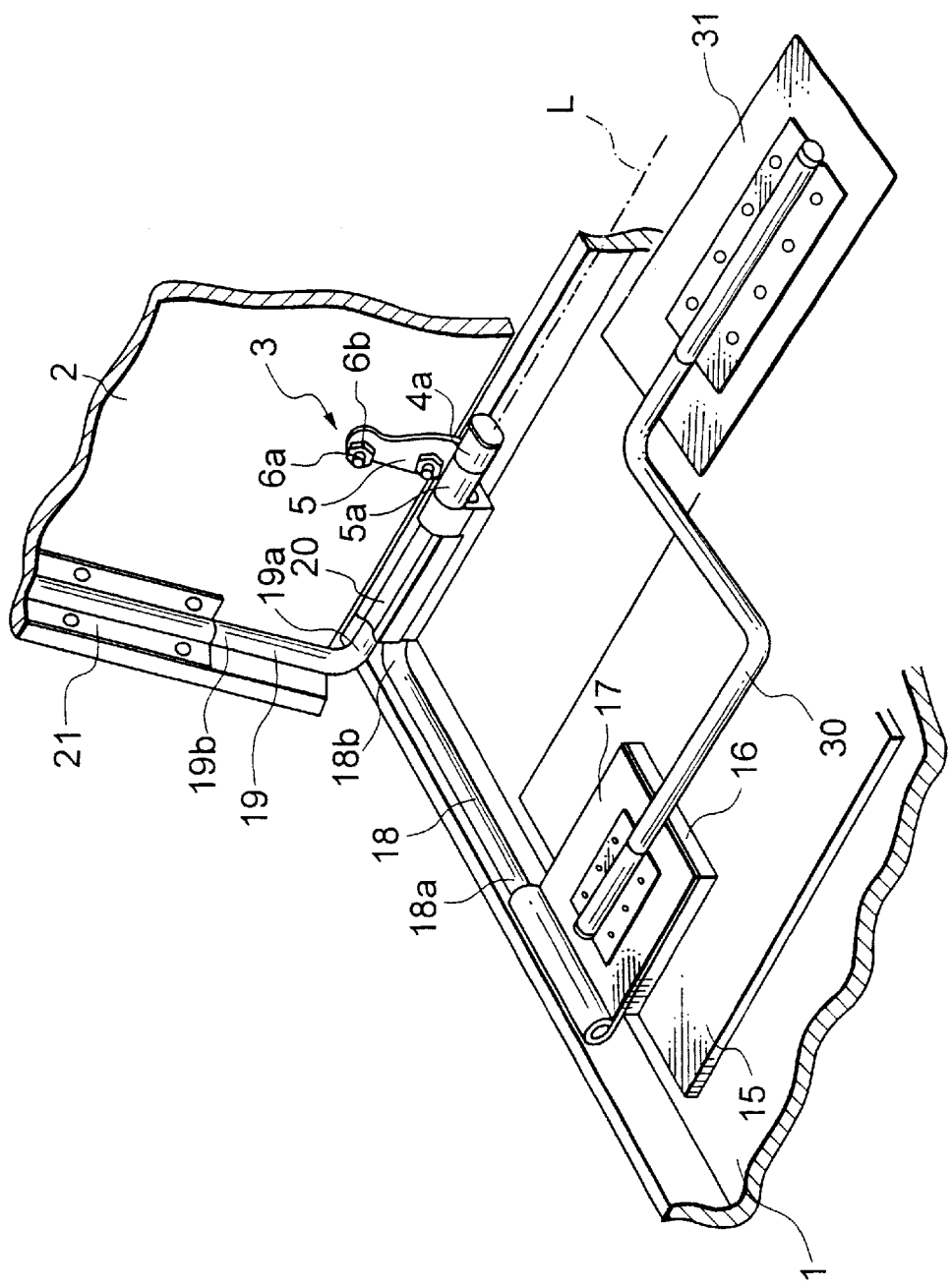
FIG. 9 is a schematic view to show one embodiment of the heat pipe hinge structure of the invention with further another heat pipe installed in the heat generating component, and with the heat pipe hinge member not directly contacted with the housing portions.

FIG. 9 is a schematic view to show one embodiment of the heat pipe hinge structure of the invention with further another heat pipe installed in the heat generating component, and with the heat pipe hinge member not directly contacted with the housing portions. As shown in FIG. 9, this embodiment combines the heat pipe hinge member and the fixed hinge portion as shown in FIG. 8, and the further another heat pipe arranged on the heat generating component as shown in FIG. 6. As described in the embodiment as shown in FIG. 6, the third heat pipe 30 is provided on the heat transfer plate 17 along the direction perpendicular to the second heat pipe 18. The heat dissipating member 31 is disposed at the other end portion of the heat pipe 30. The heat transferred by the heat pipe 30 from the heat transfer plate 17 is dissipated to the housing portion through the heat transfer member 31.

As shown in FIG. 9, the heat pipe hinge member 7 is arranged in such manner that the heat pipe hinge member is not directly contacted with neither of the housing portions. Accordingly, since the heat pipe hinge member is supported by the fixed hinge portion made of stainless steel which has low heat conductivity, the heat dispersed by the third heat pipe and transferred by the second heat pipe to the heat pipe hinge member, even if the temperature of the heat is high, is further transferred by the first heat pipe to the display side housing portion, thus the heat of high temperature is not directly transferred to the CPU side housing portion.

Figure 10:
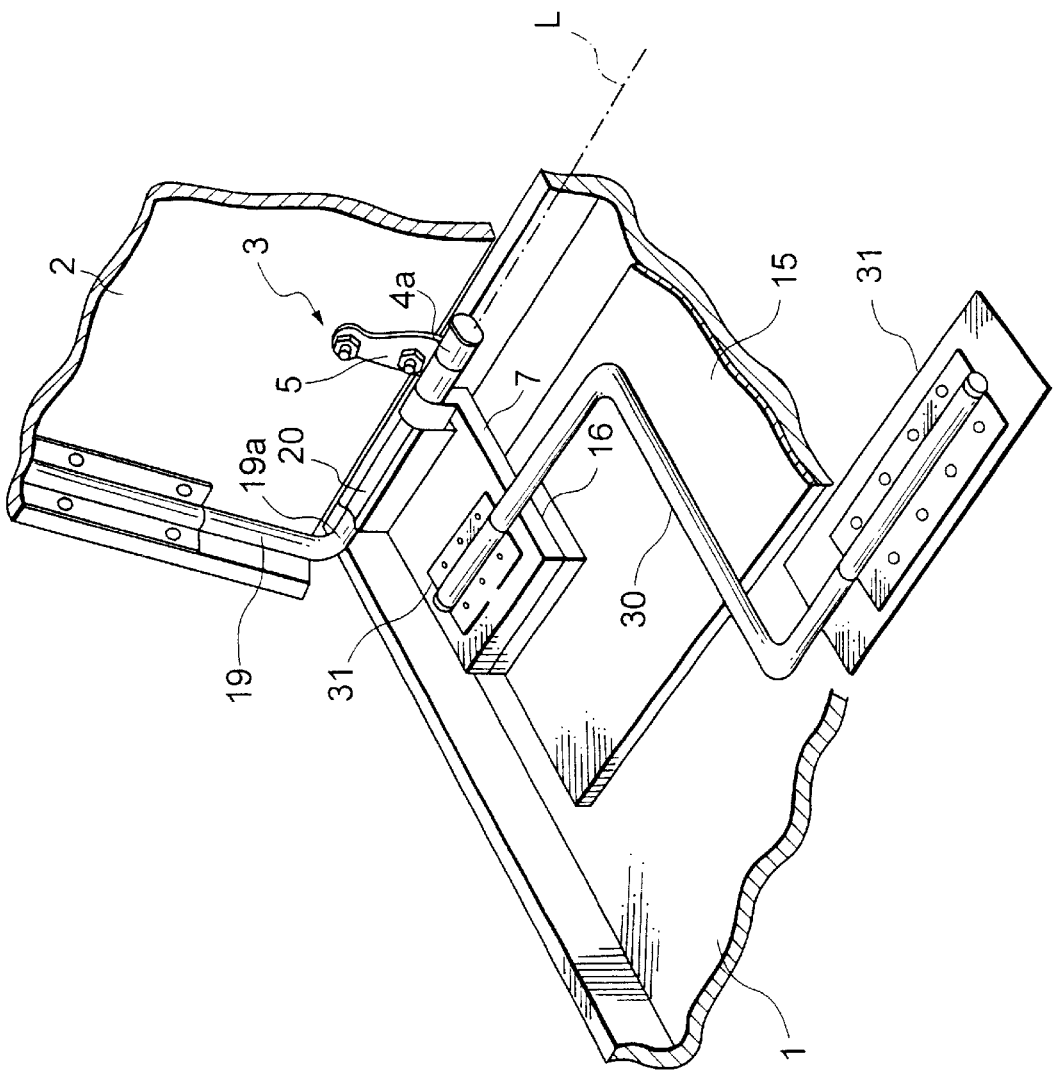
FIG. 10 is a schematic view to show one embodiment of the heat pipe hinge structure of the invention with the heat pipe hinge main body integrally formed with a heat transfer plate member connected to the heat generating component.

FIG. 10 is a schematic view to show one embodiment of the heat pipe hinge structure of the invention with the heat pipe hinge main body integrally formed with a heat transfer plate member connected to the heat generating component.

As shown in FIG. 10, the heat pipe hinge structure comprises the heat pipe hinge member and the hinge portion. The heat pipe hinge member comprises the heat pipe hinge main body and the heat pipe holding portion. The lower portion 7 of the heat pipe hinge main body extends in the direction to the heat generating component 16 to integrally form the heat transfer plate connected to the heat generating component. The heat pipe hinge member is fixed on the display side housing portion through the hinge portion 5 which has low heat conductivity. The heat pipe hinge member 7 is arranged in such manner that the heat pipe hinge member is not directly contacted with neither of the housing portions.

The heat pipe holding portion includes a heat pipe receptive groove for pivotably receiving the part of the heat pipe 19 and a heat pipe fixing member 20 made of elastic material to press the part of the heat pipe received in the heat pipe receptive groove. The evaporator section 19a of the heat pipe 19 is positioned from the upper side into the heat pipe receptive groove 10 of the heat pipe hinge member 7. When the heat pipe fixing member 20 is fitted from the upper side into the heat pipe hinge member 7, following above, the latching portions 20a in both sides are guided by the extended guiding portions 11 of the heat pipe hinge member 7 to bend the heat pipe fixing member 20 as shown in FIG. 4, and then, the latching portions 20a latch the latching groove 12 of the heat pipe hinge member 7 as shown in FIG. 3. As a result, the heat pipe fixing member 20 is fitted to the heat pipe hinge member 7, thus the evaporator section 19a of the heat pipe 19 is press-hold in the heat pipe receptive groove 10 by the pressing portion 20b.

The fixed hinge portion 4 fixed on the CPU side housing portion 1 is removed and only the supporting shaft member 4a is remained. The supporting shaft member 4a is pressed into the locating bore (not shown) of the heat pipe hinge member 7 and fixed therein. Accordingly, the supporting shaft member 4a of the fixed hinge portion 4 is inserted in the bearing portion 5a of the movable hinge portions 5.

The third heat pipe 30 is installed on the heat transfer plate. The heat dissipating member 31 is disposed at the other end of the heat pipe 30 to transfer the heat from the heat transfer plate. The heat thus transferred to the third heat pipe is dissipated to the housing portion through the heat dissipating member 31.

As shown in FIG. 10, the heat pipe hinge member 7 is arranged in such manner that the heat pipe hinge member is not directly contacted with neither of the housing portions. Accordingly, since the heat pipe hinge member is supported by the fixed hinge portion made of stainless steel which has low heat conductivity, the heat dispersed by the third heat pipe and transferred by the heat transfer plate which is the part of the heat pipe hinge member to the heat pipe hinge member, even if the temperature of the heat is high, is further transferred by the first heat pipe to the display side housing portion, thus the heat of high temperature is not directly transferred to the CPU side housing portion.

Figure 11:
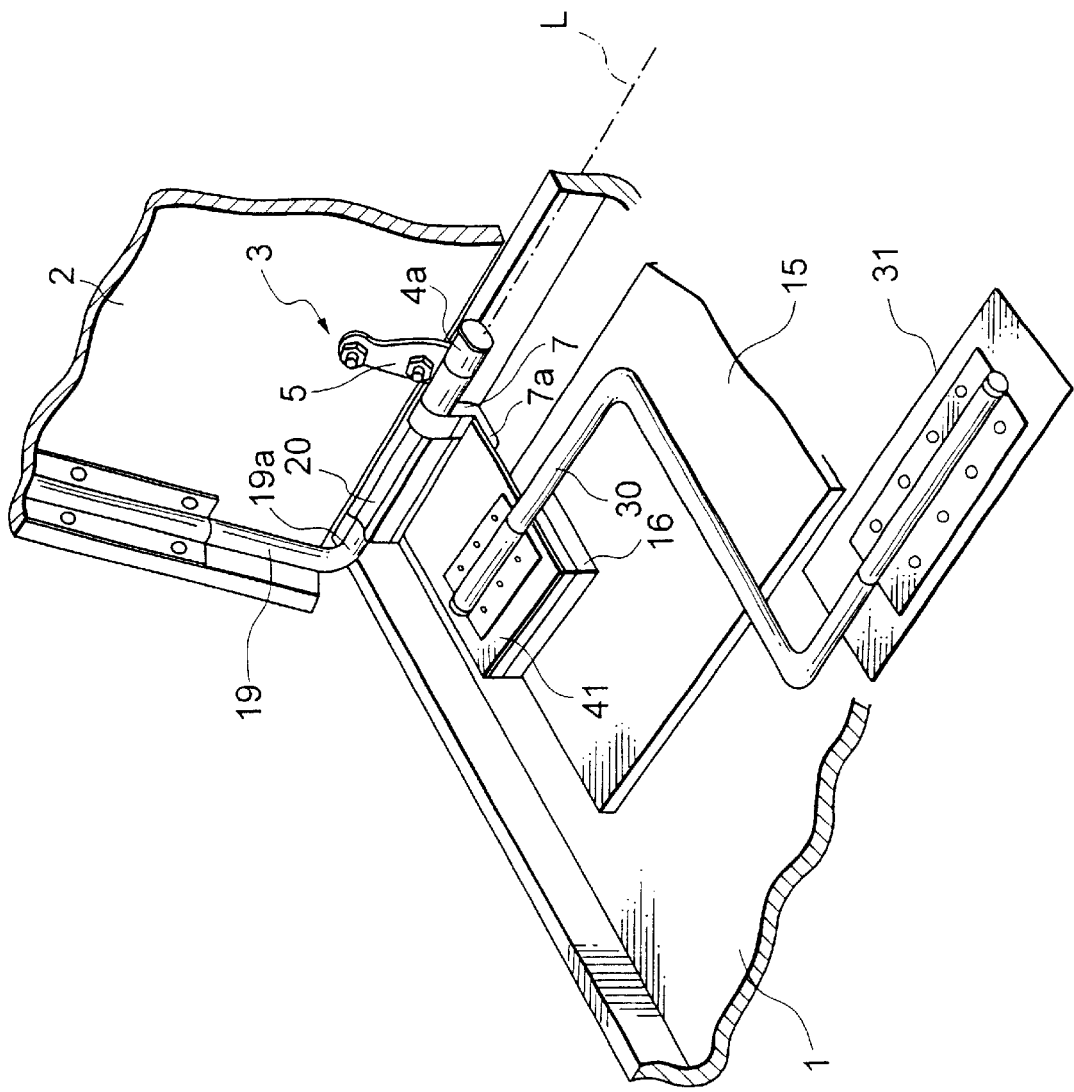
FIG. 11 is a schematic view to show one embodiment of the heat pipe hinge structure of the invention with the heat pipe hinge main body including a connecting portion to connect to a heat transfer plate member which transfers the heat of the heat generating component.

FIG. 11 is a schematic view to show one embodiment of the heat pipe hinge structure of the invention with the heat pipe hinge main body including a connecting portion to connect to a heat transfer plate member which transfers the heat of the heat generating component. As shown in FIG. 11, the heat pipe hinge structure comprises the heat pipe hinge member and the hinge portion. The heat pipe hinge member comprises the heat pipe hinge main body and the heat pipe holding portion. The connecting portion 7a is provided on the lower portion 7 of the heat pipe hinge main body, as shown in FIG. 11. The connecting portion is connected to the heat transfer plate 41 which is connected to the heat generating component 16. The heat pipe hinge member is fixed on the display side housing portion through the hinge portion 5 which has low heat conductivity. The heat pipe hinge member 7 is arranged in such manner that the heat pipe hinge member is not directly contacted with neither of the housing portions.

The holding portion includes a heat pipe receptive groove for pivotably receiving the part of the heat pipe 19 and a heat pipe fixing member 20 made of elastic material to press the part of the heat pipe received in the heat pipe receptive groove. The evaporator section 19a of the heat pipe 19 is positioned from the upper side into the heat pipe receptive groove 10 of the heat pipe hinge member 7. When the heat pipe fixing member 20 is fitted from the upper side into the heat pipe hinge member 7, following above, the latching portions 20a in both sides are guided by the extended guiding portions 11 of the heat pipe hinge member 7 to bend the heat pipe fixing member 20 as shown in FIG. 4, and then, the latching portions 20a latch the latching groove 12 of the heat pipe hinge member 7 as shown in FIG. 3. As a result, the heat pipe fixing member 20 is fitted to the heat pipe hinge member 7, thus the evaporator section 19a of the heat pipe 19 is press-hold in the heat pipe receptive groove 10 by the pressing portion 20b.

The fixed hinge portion 4 fixed on the CPU side housing portion 1 is removed and only the supporting shaft member 4a is remained. The supporting shaft member 4a is pressed into the locating bore (not shown) of the heat pipe hinge member 7 and fixed therein. Accordingly, the supporting shaft member 4a of the fixed hinge portion 4 is inserted in the bearing portion 5a of the movable hinge portions 5.

The third heat pipe 30 is installed on the heat transfer plate 41. The heat dissipating member 31 is disposed at the other end of the heat pipe 30 to transfer the heat from the heat transfer plate. The heat thus transferred to the third heat pipe is dissipated to the housing portion through the heat dissipating member 31.

As shown in FIG. 11, the heat pipe hinge member 7 is arranged in such manner that the heat pipe hinge member is not directly contacted with neither of the housing portions. Accordingly, since the heat pipe hinge member is supported by the fixed hinge portion made of stainless steel which has low heat conductivity, the heat dispersed by the third heat pipe and transferred by the heat transfer plate 41 to the heat pipe hinge member, even if the temperature of the heat is high, is further transferred by the first heat pipe to the display side housing portion, thus the heat of high temperature is not directly transferred to the CPU side housing portion.

Even though the third heat pipe is provided in the embodiments as shown in FIGS. 10 and 11 to disperse the heat to the different direction, the third pipe is not necessarily disposed therein.

Figure 12:
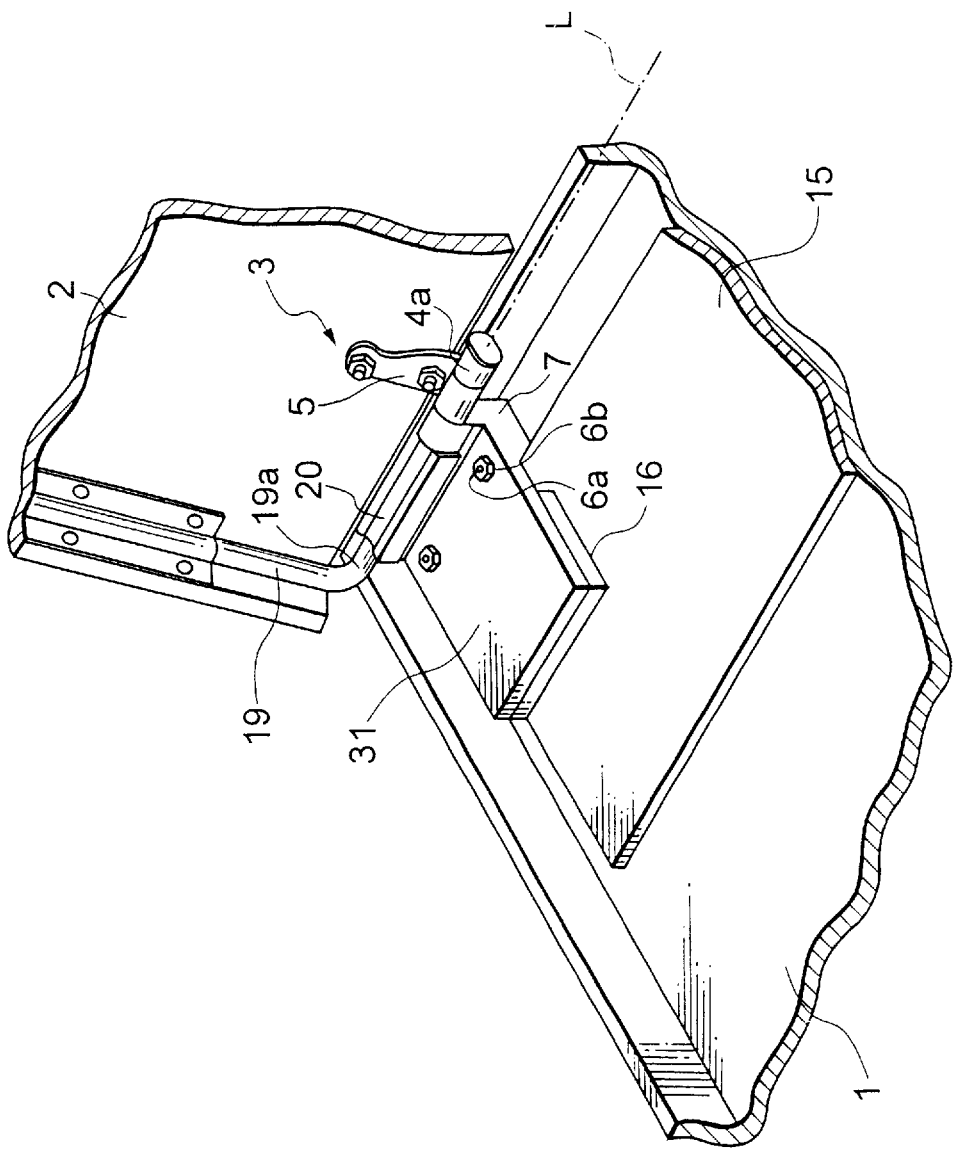
FIG. 12 is a schematic view to show one embodiment of the heat pipe hinge structure of the invention with the heat generating component disposed in the vicinity of the axis L of the opening and closing of the housing portions.

The second heat pipe 18 may be removed in case that the heat generating component such as CPU is positioned in the vicinity of the opening and closing axis L of the housing portions. FIG. 12 is a schematic view to show one embodiment of the heat pipe hinge structure of the invention with the heat generating component disposed in the vicinity of the axis L of the opening and closing of the housing portions. The heat pipe hinge member 7 is integrally formed with the heat transfer block 31. The heat transfer block is fixed on the CPU housing portion 1 by means of the vis 6a and the nut 6b. Since one side portion of the heat transfer block 31 is placed in close contact on the CPU 16, the heat generated by the CPU is transferred to the heat pipe hinge member 7 through the heat transfer block 31. Since the heat transfer block 31 is made of copper, gold, silver, graphite or the like which has excellent heat conductivity, and the heat transfer route from the CPU 16 to the heat pipe hinge member 7 is short, the heat generated by the CPU 16 is fully and effectively transferred to the heat pipe hinge member without applying the second heat pipe 18, and then dissipated to the display side housing portion 2 through the first heat pipe 19.

Figure 13:
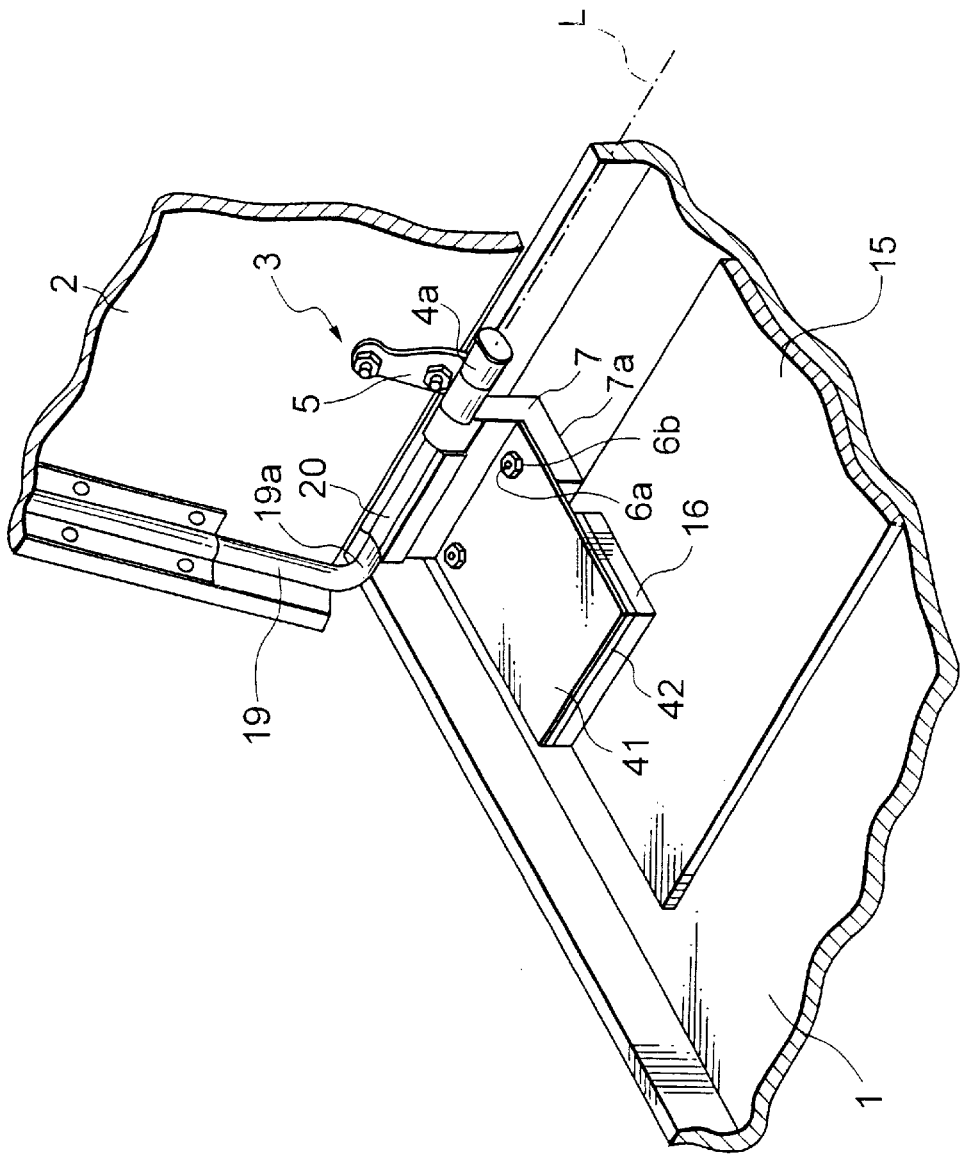
FIG. 13 is a schematic view to show another embodiment of the heat pipe hinge structure of the invention with the heat generating component disposed in the vicinity of the axis L of the opening and closing of the housing portions.

Furthermore, another embodiment is shown in FIG. 13. In this embodiment, the heat transfer block 41 and the heat pipe hinge member 7 are separately prepared, and one side portion of the heat transfer block 41 is fixed on the CPU side housing portion together with the fixing surface portion 7a of the heat pipe hinge member 7 by means of the vis 6a and the nut 6b. The other side portion of the heat transfer block 41 is placed in close contact on the CPU 16 through the heat transfer plate 42. Since the heat transfer block 41 and the heat transfer plate 42 are made of copper, gold, silver, graphite or the like, as same as the above-mentioned heat transfer block 31, the heat generated by the CPU 16 is sufficiently and effectively transferred to the heat pipe hinge member 7 through the heat transfer plate 42 and the heat transfer block 41. Since the coupling manner of the first heat pipe 19 and the heat pipe hinge member 7 in the embodiments as shown in FIGS. 12 and 13 is quite the same as those in other embodiments described above, the evaporator section 19a of the first heat pipe is placed in the heat pipe receptive groove 10 of the heat pipe hinge member 7, and the heat pipe fixing member 20 is fitted into from the upper side, thus the heat pipe and the heat pipe hinge member is very easily coupled.

Furthermore, a heat sink may be applied in place of the heat transfer plate member connected to the heat pipe hinge member in the present invention.

Figure 14:
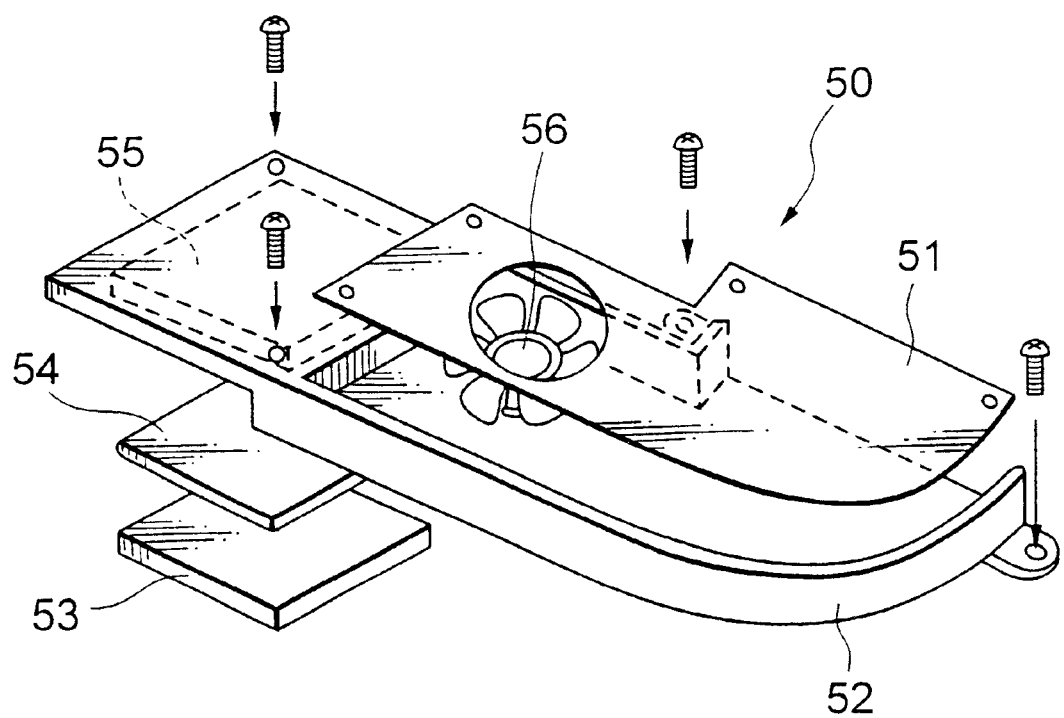
FIG. 14 is a schematic view to show the heat sink used in the invention.

FIG. 14 is a schematic view to show the heat sink connected to the heat pipe hinge main body. As shown in FIG. 14, the heat sink 50 comprises a heat sink main body 52 and a plate member 51 in which an air inlet is provided. An air cooling fan is installed in the heat sink main body 52. The air cooling fan is driven by a motor, and the propeller thereof comprising integrally formed blades and rotational axis portion is made of an engineering plastics, thus the weight thereof is light. The driving motor located in the vicinity of the rotational axis is pressed into a groove portion (not shown) provided in a prescribed position of the heat sink, or fixed on the heat sink main body by means of adhesion. The power lines of the motor extend outside of the heat sink.

The upper portion of one end portion of the heat sink main body may be protruded outward in such manner that the heat sink main body is easily contacted with the CPU or the like as the heat generating device, as shown in FIG. 14. The heat receiving portion 55 is connected in close contact to the CPU 53 or the like through the heat transfer rubber 54. It is preferable that the heat sink main body is made of aluminum, copper or the like which has excellent heat conductivity to improve the heat dissipating efficiency. Die casting aluminum is in particular preferable in view of easy manufacturing. The plate member 51 having the air inlet of the heat sink 50 is preferably made of aluminum, copper or the like which has excellent heat conductivity, as same as the heat sink main body. For example, an aluminum plate is the most appropriate in view of heat dissipating property, formability and light weighting.

Figure 15:
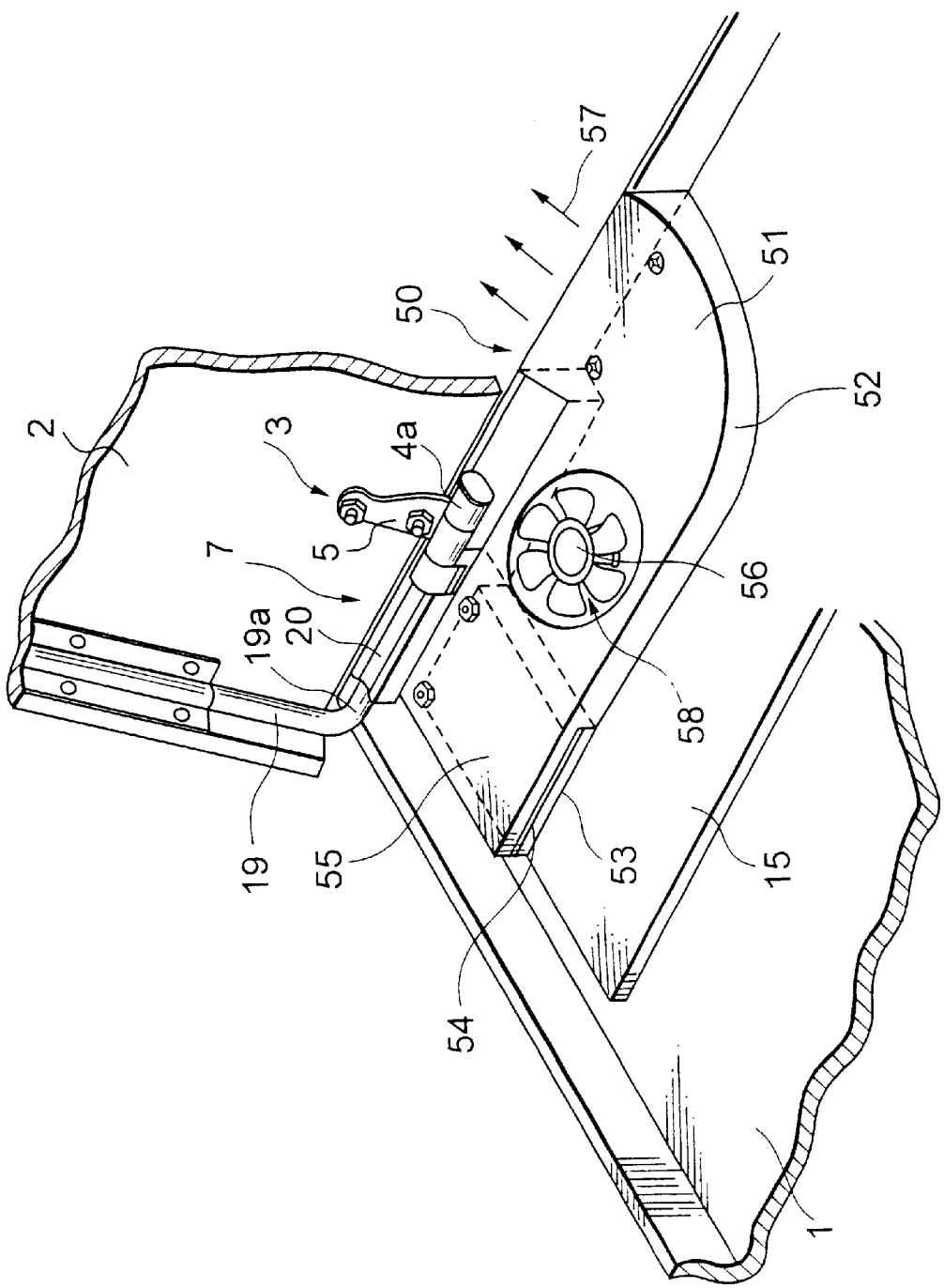
FIG. 15 is a schematic partial perspective view to show one embodiment of the heat pipe hinge structure for an electronic device of the present invention.

FIG. 15 is a schematic partial perspective view to show one embodiment of the heat pipe hinge structure for an electronic device of the present invention in which the above-mentioned heat sink is connected to the heat pipe hinge member.

As shown in FIG. 15, the heat sink 50 is arranged in such manner that the heat receiving portion 55 is connected in close contact to the heat generating component, for example, the CPU 53 mounted on the printed wiring board 15 though the heat transfer rubber 54. Furthermore, the heat receiving portion 55 of the heat sink is connected in close contact to the heat pipe hinge member 7. Accordingly, part of the heat generated by the CPU is transferred to the heat pipe hinge main body of the heat pipe hinge member through the heat sink main body per se, and then transferred to the display side housing portion 2 from the evaporator section 19a of the first heat pipe 19. Furthermore, the remaining heat generated by the CPU is transferred through inside of the heat sink by the air inhaled as shown by the arrow 58 from the air inlet by means of the motor driven air cooling fan installed in the heat sink, and coercively exhaled out of the CPU side housing portion as shown by the arrow 57.

Figure 16A:
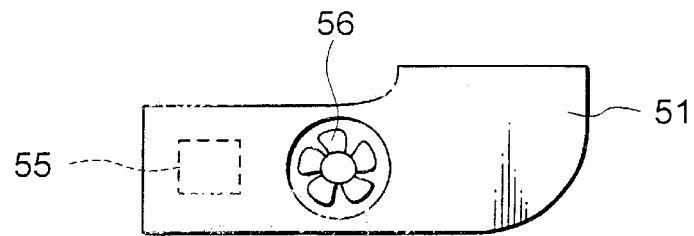
FIG. 16 is a schematic view to show in detail the heat sink used in the present invention.
Figure 16B:
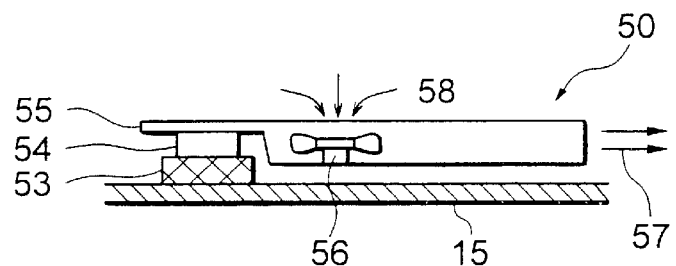
Figure 17A:
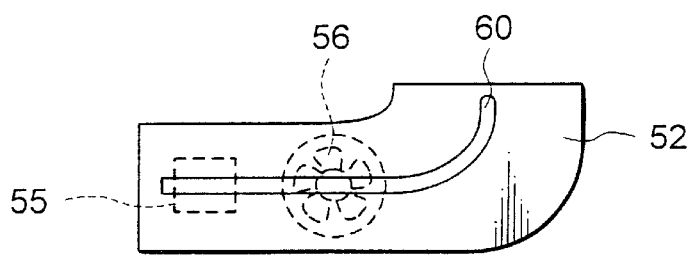
FIG. 17 is a schematic view to show in detail the heat sink with a heat pipe disposed therein used in the present invention.
Figure 17B:
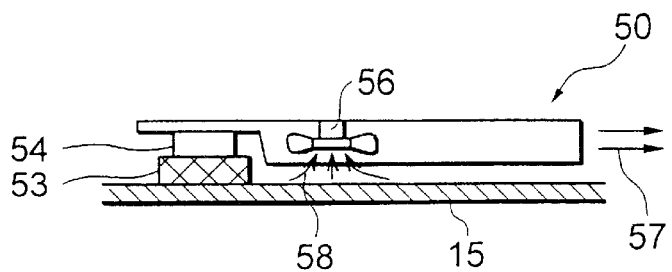
Figure 18:
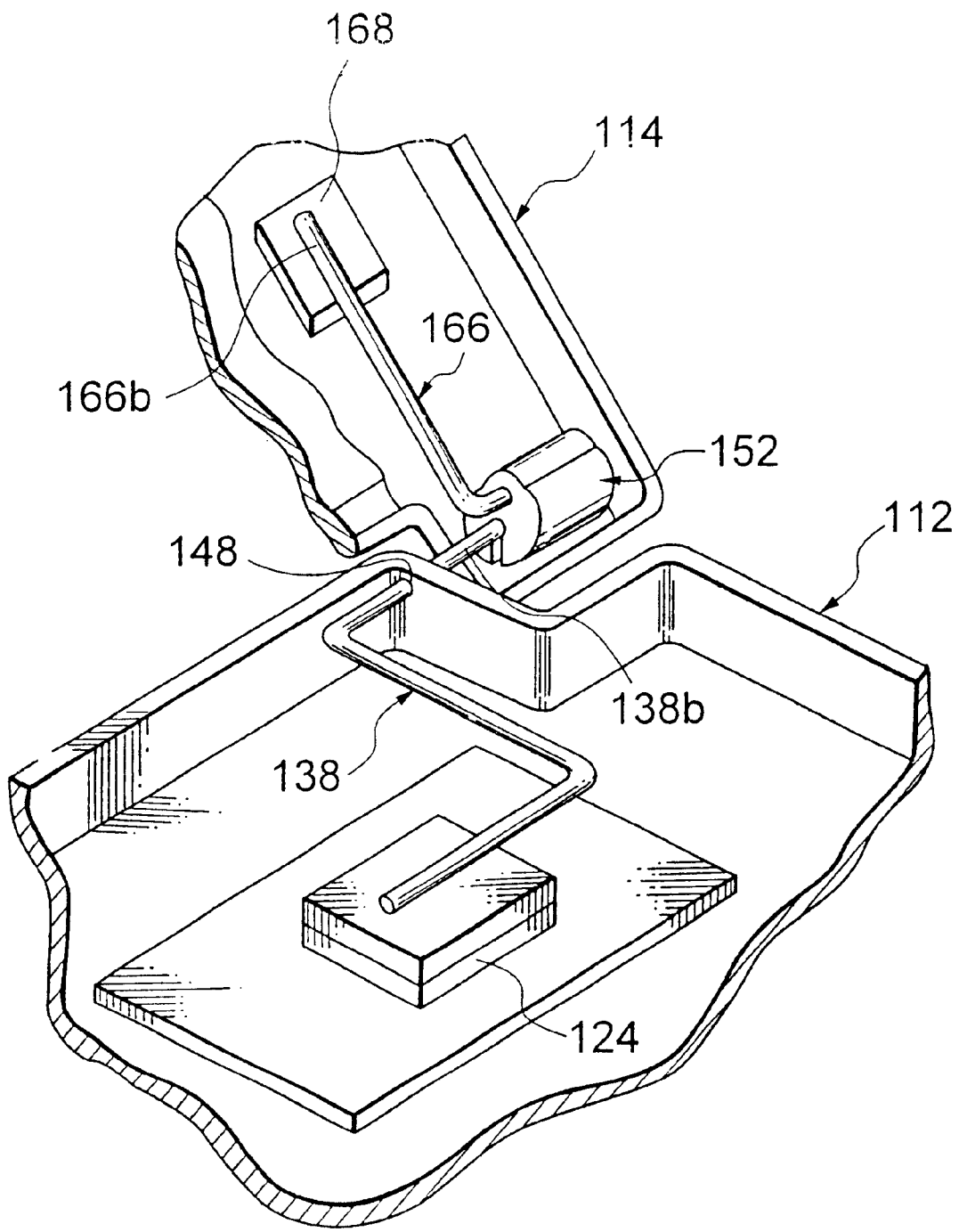
FIG. 18 is a schematic view to show a conventional hinge structure.

The air inlet may be arranged on either the upper surface or lower surface of the heat sink. FIG. 16 and FIG. 17 are respective schematic views to show in detail the heat sink used in the present invention. FIG. 16(*a*) is a schematic plan view to show the heat sink with the air inlet installed on the upper surface thereof. FIG. 16(*b*) is a schematic side view to show the above embodiment. FIG. 17(*a*) is a schematic plan view to show the heat sink with the air inlet installed on the lower surface of the heat sink and the heat pipe further installed.

As shown in FIG. 16, the heat generated by the CPU mounted on the printed wiring board is transferred to the heat receiving portion 55, and then, further transferred through the inside of the heat sink by the air cooling fan 56 installed in the heat sink and exhaled out of the housing as shown by the arrow 57. In particular, the heat receiving portion 55 of the heat sink main body has such an appropriate thickness as having the function of heat storage. Accordingly, the heat sink instantaneously absorbs the heat generated by the heat generating device by means of the heat storage function, and then the absorbed heat is transferred to the outside of the housing by the motor driven air cooling fan installed in the heat sink main body. Therefore, the heat from the heat generating device is quickly absorbed, thus reducing the damage of the heat generating device caused by the generated heat.

As shown in FIG. 17, when another heat pipe is installed along the portion of the heat sink from the heat receiving portion of the heat sink main body to the air exhale outlet, the heat dissipating efficiency is further improved. The another heat pipe may be arranged in such manner, for example, that the groove is provided in the heat sink main body for receiving in close contact the heat pipe, and the heat pipe is pressed into the groove and fixed therein. Furthermore, the heat transfer grease may be disposed so as to fill the vacant space between the groove and the heat pipe, thus improving the heat conductivity.

Furthermore, there is provided a cooling device for an electronic equipment including the above-mentioned heat pipe hinge structure of the invention. More specifically, the cooling device for an electronic equipment of the invention comprises (1) a heat pipe hinge member made of a high heat-conductive material disposed at a coupling portion in which a pair of housing portions to be opened and closed are coupled, the heat pipe hinge member comprising a heat pipe hinge main body to receive a heat from a heat generating component disposed in one of the pair of housing portions, and a holding portion provided in a vicinity of the heat pipe hinge main body to pivotably hold by an elastic member at least a part of a first heat pipe disposed in other of the pair of housing portions, (2) a hinge portion made of a low heat-conductive material to fix the heat pipe hinge member on at least one housing portion of the pair of housing portions, and (3) a heat sink to be connected with the heat generating component and the heat pipe hinge main body to transfer the heat of the heat generating component out of the pair of housing portions.

In the cooling device for the electronic equipment, the holding portion includes a heat pipe receptive groove for pivotably receiving the part of the first heat pipe and a heat pipe fixing member made of elastic material to press the part of the heat pipe received in the heat pipe receptive groove, and the heat sink includes a cooling fan in an interior thereof. Furthermore, in the cooling device for the electric equipment of the invention, the heat sink includes another heat pipe.

As described above, according to the heat pipe hinge structure for an electronic device of the invention, the temperature of the specific portion of the pair of the housing portions is prevented from becoming excessively high, thus extending the scope of selecting the material of the display side housing portion and the CPU side housing portion.

Furthermore, according to the heat pipe hinge structure for an electronic device of the invention, the coupling of the heat pipe and the heat pipe hinge member is easily implemented only by placing the heat pipe into the heat pipe receptive groove and fitting the heat pipe fixing member, thus remarkably simplifying the fabrication process of the electronic device.

In addition, according to the heat pipe hinge structure for an electronic device of the invention, since the heat pipe is elastically pressed by the pressing portion of the heat pipe fixing member, the sufficient contact area can be secured between the heat pipe hinge member and the heat pipe so as for the heat to be effectively transferred, thus remarkable heat dissipating effect can be obtained.

Furthermore, according to the heat pipe hinge structure for an electronic device of the invention, since the opening and closing of the housing portions can be guided by the hinge portion independently without involving the heat pipe, the unexpected power from the outside is not applied to the heat pipe, and the heat pipe is prevented from being damaged. In addition, since the rotational axis of the heat pipe is automatically in accordance with the opening and closing axis of the hinge portion, the damage of the heat pipe can be surely prevented from being occurred, and the fabrication process can be simplified.

In addition, according to the heat pipe hinge structure for an electronic device of the invention, since the heat pipe hinge member is used together with the hinge portion, number of the components can be reduced.

Furthermore, according to the heat pipe hinge structure for an electronic device of the invention, since the heat generated by the heat generating component can be quickly and largely dissipated the heat sink, in addition to the heat dissipation by the heat pipe connected to the heat pipe hinge member, the temperature of the heat pipe hinge member can be prevented from becoming excessively high. As a result, the scope of selecting the material of the display side housing portion and the CPU side housing portion can be widely extended.

What is claimed is:

1. A heat pipe hinge structure for coupling a pair of housing portions of an electronic device to be opened and closed comprising:

a heat pipe hinge member made of a heat-conductive material, said heat pipe hinge member comprising a heat pipe hinge main body including a locating bore and a holding bore to securely hold one end portion of a second heat pipe to receive a heat through said second heat pipe from a heat generating component disposed in one of said pair of housing portions, and a heat pipe holding portion provided in said heat pipe hinge main body to pivotably hold at least a part of a first heat pipe disposed in other of said pair of housing portions, said heat pipe holding portion includes a heat pipe receptive groove for pivotably receiving said part of said first heat pipe, extended guiding portions, and a heat pipe fixing member having a pressing portion and latching portions made of elastic material to press said part of said first heat pipe received in said heat pipe receptive groove; and a hinge portion comprising a fixed hinge portion and a movable hinge portion to fix said heat pipe hinge member on at least one housing portion of said pair of housing portions and guide opening and closing of said pair of housing portions, said fixed hinge portion having a supporting shaft member being fixed thereon, said supporting shaft member being fitted in said locating bore, and said movable hinge portion including a cylindrical bearing portion in which said supporting shaft member is inserted.

2. A heat pipe hinge structure for coupling a pair of housing portions of an electronic device to be opened and closed comprising:

a heat pipe hinge member made of a heat-conductive material, said heat pipe hinge member including:

a heat pipe hinge main body including a locating bore disposed adjacent a holding bore, said holding bore receives a first heat pipe;

a heat pipe receptive groove disposed at said locating bore, said heat pipe receptive groove receives a second heat pipe;

a heat pipe fixing member, said heat pipe fixing member disposed at said heat pipe receptive groove, said heat pipe fixing member covers a portion of said second heat pipe; and a hinge portion in operable communication with said heat pipe hinge member, said hinge portion secures said heat pipe hinge member on at least one housing portion of said pair of housing portions, said hinge portion guides said pair of housing portions to be opened and closed.

3. The structure of claim 2, wherein said heat pipe fixing member is made of an elastic material.

4. The structure of claim 2, wherein said heat pipe fixing member includes a latching end, said latching end disposed at said locating bore.

5. The structure of claim 2, wherein said hinge portion includes a movable hinge portion disposed adjacent said heat pipe hinge member, said movable hinge portion having a bearing portion.

6. The structure of claim 5, wherein said hinge portion includes a fixed hinge portion disposed adjacent said movable hinge portion, said fixed hinge portion having a support shaft member that is received by said bearing portion.

7. The structure of claim 6, wherein said locating bore aligns with said bearing portion, said support shaft member extends through said movable hinge portion and is received by said locating bore.

8. A heat pipe hinge structure for coupling a pair of housing portions of an electronic device to be opened and closed comprising:

a heat pipe hinge member made of a heat-conductive material, said heat pipe hinge member comprising a heat pipe hinge main body including a locating bore disposed adjacent a holding bore, said holding bore to securely hold one end portion of a second heat pipe and a heat pipe holding portion provided in said heat pipe hinge main body to pivotably hold at least a part of a first heat pipe, said heat pipe holding portion includes a heat pipe receptive groove for pivotably receiving said part of said first heat pipe, and a heat pipe fixing member having a pressing portion and latching portions made of elastic material to press said part of said first heat pipe received in said heat pipe receptive groove; and a hinge portion comprising a fixed hinge portion and a movable hinge portion to fix said heat pipe hinge member on at least one housing portion of said pair of housing portions and guide opening and closing of said pair of housing portions, said fixed hinge portion having a supporting shaft member being fixed thereon, said supporting shaft member being fitted in said locating bore, and said movable hinge portion including a cylindrical bearing portion in which said supporting shaft member is inserted.

\* \* \* \* \*